(12) United States Patent
Bewley et al.

(10) Patent No.: US 9,902,058 B1
(45) Date of Patent: *Feb. 27, 2018

(54) MULTIMODAL DYNAMIC ROBOTIC SYSTEMS

(71) Applicant: THE REGENTS OF THE UNIVERSITY OF CALIFORNIA, Oakland, CA (US)

(72) Inventors: Thomas R. Bewley, La Jolla, CA (US); Christopher M. Schmidt-Wetekam, Solana Beach, CA (US); Nicholas Morozovsky, Castro Valley, CA (US); Matt Grinberg, San Francisco, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/701,406

(22) Filed: Sep. 11, 2017

Related U.S. Application Data

(60) Continuation of application No. 14/656,676, filed on Mar. 12, 2015, now Pat. No. 9,757,855, which is a
(Continued)

(51) Int. Cl.
*B25J 5/00* (2006.01)
*B25J 9/16* (2006.01)
(Continued)

(52) U.S. Cl.
CPC ............... *B25J 5/007* (2013.01); *B25J 5/005* (2013.01); *B25J 9/1694* (2013.01); *B62D 37/00* (2013.01);
(Continued)

(58) Field of Classification Search
CPC .......... B25J 5/007; B25J 9/1694; B25J 5/005; B62D 37/00; B62D 55/00; B62D 55/075;
(Continued)

(56) References Cited

U.S. PATENT DOCUMENTS 2,247,354 A 7/1941 Berger
3,648,408 A 3/1972 Terzian et al.
(Continued)

OTHER PUBLICATIONS

Armour, Rhodri H. et al., Rolling in Nature and Robotics: A Review, Journal of Bionic Engineering, 2006, vol. 3 No. 4, pp. 195-208.
(Continued)

*Primary Examiner* — Jason Holloway
(74) *Attorney, Agent, or Firm* — Eleanor Musick; Musick Davison LLP

(57) ABSTRACT

Robotic systems include a frame or body with two or more wheels rotatably mounted on the frame or body and a motor for driving each wheel. A system controller generates a signal for actuating each motor based on information provided by one or more sensors in communication with the system controller for generating feedback signals for providing reactive actuation of the motors for generating one or more functions selected from the group consisting of forward motion, backward motion, hopping, climbing, and balancing. A power source is included for providing power to operate the drive motors, system controller and the one or more sensors.

20 Claims, 34 Drawing Sheets

Related U.S. Application Data division of application No. 13/389,256, filed as application No. PCT/US2010/044790 on Aug. 6, 2010, now Pat. No. 9,020,639.

(60) Provisional application No. 61/324,258, filed on Apr. 14, 2010, provisional application No. 61/231,672, filed on Aug. 6, 2009.

(51) Int. Cl.

| | | |
|---|---|---|
| *B62D 57/02* | (2006.01) | |
| *B62D 55/075* | (2006.01) | |
| *B62D 37/00* | (2006.01) | |
| A63H 15/06 | (2006.01) | |
| A63H 17/26 | (2006.01) | |
| B60K 7/00 | (2006.01) | |
| B62D 55/00 | (2006.01) | |

(52) U.S. Cl.
CPC ........... *B62D 55/075* (2013.01); *B62D 57/02* (2013.01); *A63H 15/06* (2013.01); *A63H 17/262* (2013.01); *A63H 17/266* (2013.01); *B60K 7/00* (2013.01); *B62D 55/00* (2013.01); *Y10S 901/01* (2013.01)

(58) Field of Classification Search
CPC ........ B62D 57/02; B62D 11/00; A63H 15/06; A63H 17/262; A63H 17/266; A63H 33/005; Y10S 901/01; B60B 19/14; B60K 17/043; B60K 7/00; B60K 7/0007
See application file for complete search history.

(56) References Cited

U.S. PATENT DOCUMENTS

| | | | |
|---|---|---|---|
| 4,736,826 A | 4/1988 | White et al. | |
| 5,279,170 A | 1/1994 | Chen | |
| 5,281,079 A | 1/1994 | Lemelson | |
| 5,297,981 A | 3/1994 | Maxim et al. | |
| 5,618,219 A | 4/1997 | Simone et al. | |
| 5,741,169 A | 4/1998 | Chen | |
| 6,066,026 A | 5/2000 | Bart et al. | |
| 6,068,073 A | 5/2000 | Roston et al. | |
| 6,227,934 B1 | 5/2001 | Isaksson et al. | |
| 6,247,546 B1 | 6/2001 | Spletzer et al. | |
| 6,289,263 B1 | 9/2001 | Mukherjee | |
| 6,308,791 B1 | 10/2001 | Spletzer et al. | |
| 6,502,657 B2 | 1/2003 | Kerrebrock et al. | |
| 6,548,982 B1 | 4/2003 | Papanikolopoulos et al. | |
| 6,668,951 B2 | 12/2003 | Won | |
| 6,793,026 B1 | 9/2004 | De Fazio | |
| 6,896,078 B2 | 5/2005 | Wakui | |
| 6,896,079 B1 | 5/2005 | Wakui | |
| 6,939,197 B1 | 9/2005 | Hoeting | |
| 7,004,268 B2 | 2/2006 | Song et al. | |
| 7,004,269 B2 | 2/2006 | Song et al. | |
| 7,011,171 B1* | 3/2006 | Poulter | B60B 15/023 180/65.1 |
| 7,172,488 B2 | 2/2007 | Moll et al. | |
| 7,249,640 B2 | 7/2007 | Horchler et al. | |
| 7,263,955 B1 | 9/2007 | Fischer | |
| 7,494,398 B2 | 2/2009 | Laurienzo | |
| 7,581,605 B2* | 9/2009 | Caspi | B62B 5/02 180/8.1 |
| 7,600,593 B2* | 10/2009 | Filippov | B25J 5/005 180/65.8 |
| 7,654,348 B2 | 2/2010 | Ohm et al. | |
| 7,719,222 B2 | 5/2010 | Theobald | |
| 7,882,915 B1 | 2/2011 | Wishart | |
| 8,010,232 B2 | 8/2011 | Nakajima et al. | |
| 8,083,013 B2 | 12/2011 | Bewley et al. | |
| 8,186,469 B2 | 5/2012 | Yim et al. | |
| 8,321,053 B2 | 11/2012 | Ruan et al. | |
| 8,393,422 B1* | 3/2013 | Pensel | B62D 55/0655 180/9.4 |
| 8,875,815 B2* | 11/2014 | Terrien | B25J 5/005 180/65.1 |
| 9,757,855 B2* | 9/2017 | Bewley | B25J 5/005 |
| 2001/0031604 A1 | 10/2001 | Hornsby et al. | |
| 2002/0189871 A1 | 12/2002 | Won | |
| 2004/0000439 A1 | 1/2004 | Burt et al. | |
| 2004/0050191 A1 | 3/2004 | Chung | |
| 2006/0045679 A1 | 3/2006 | Ostendorff | |
| 2006/0046612 A1 | 3/2006 | Laurienzo | |
| 2007/0150110 A1 | 6/2007 | Delson | |
| 2007/0193790 A1* | 8/2007 | Goldenberg | B62D 55/075 180/9.1 |
| 2007/0199108 A1 | 8/2007 | Angle et al. | |
| 2007/0259602 A1 | 11/2007 | Dunham | |
| 2008/0179115 A1 | 7/2008 | Ohm et al. | |
| 2008/0231221 A1 | 9/2008 | Ogawa | |
| 2008/0231222 A1 | 9/2008 | Hashimoto et al. | |
| 2010/0116566 A1 | 5/2010 | Ohm et al. | |
| 2010/0122859 A1 | 5/2010 | Schroll | |
| 2010/0258365 A1* | 10/2010 | Jacobsen | B62D 55/27 180/9.1 |
| 2011/0071677 A1 | 3/2011 | Stilman | |
| 2012/0185087 A1 | 7/2012 | Kang | |
| 2012/0261204 A1 | 10/2012 | Won | |
| 2013/0330162 A1 | 12/2013 | Horinouchi | |
| 2015/0210329 A1 | 7/2015 | Hutcheson et al. | |

OTHER PUBLICATIONS

Au, K.W. et al., Decoupled Dynamics and Stabilization of Single Wheel Robot, Proceedings of the 1999 IEEE/RSJ International Conference on Intelligent Robots and Systems (IROS '99), Oct. 1999, pp. 197-203.

Brown Jr., H. Benjamin et al., A Single-Wheel, Gyroscopically Stabilized Robot, IEEE Robotics & Automation Magazine, Sep. 1997, pp. 39-44.

Crossley, Vincent A., A Literature Review on the Design of Spherical Rolling Robots, citeseerx.ist.psu.edu, 2006, pp. 1-6.

International Search Report and Written Opinion dated Apr. 26, 2011 in PCT/US2010/044790, 10 pages.

Nandy, Gora C. et al., Dynamic Model of a Gyroscopic Wheel, Proceedings of the 1998 IEEE International Conference on Robotics & Automation, Leuven, Belgium, May 1998, pp. 2683-2688.

Ou, Yongsheng et al., Gyroscopically Stabilized Robot: Balance and Tracking, International Journal of Advanced Robotic Systems, 2004, vol. 1 No. 1, ISSN 1729-8806, pp. 23-32.

Schmidt-Wetekam, Christopher et al. An Arm Suspension Mechanism for an Underactuated Single Legged Hopping Robot, 2011 IEEE International Conference on Robotics and Automation, Shanghai International Conference Center, May 9-13, 2011 Shanghai China, pp. 5529-5534.

Schmidt-Wetekam, Christopher et al. Design, Optimization, and Control of a New Class of Reconfigurable Hopping Rovers, Proceedings of the 46th IEEE Conference on Decision and Control, New Orleans, LA USA, Dec. 12-14, 2007, pp. 5150-5155.

Schmidt-Wetekam, Christopher et al. Inertial Rotation Center Position Estimation for a Perching Treaded Vehicle, 2011 IEEE/RSJ International Conference on Intelligent Robots and Systems, Sep. 25-30, 2011, San Francisco, CA US, pp. 4097-4102.

Srivastava, Deepak Kumar, Slow Rotation of Concentric Spheres with Source at Their Centre in a Viscous Fluid, Hindawi Publishing Corporation, Journal of Applied Mathematics, 2009, vol. 2009, Article ID 740172, 13 pages.

Tsai, Shu-Jen et al., Control of the Gyrover, A Single-Wheel Gyroscopically Stabilized Robot, Proceedings of the IEEE/RSJ International Conference on Intelligent Robots and Systems (IROS'99), Oct. 1999, pp. 179-184.

Xu, Yangsheng et al., Dynamic Mobility with Single-Wheel Configuration, The International Journal of Robotics Research, vol. 18, No. 7, Jul. 1999, pp. 728-738.

Ylikorpi, Tomi et al., Ball-shaped Robots, Climbing & Walking Robots, Towards New Applications, Book edited by Houxiang

(56) References Cited

OTHER PUBLICATIONS

Zhang, ISBN 978-3-902613-16-5, Itech Education and Publishing, Vienna, Austria, Oct. 2007, pp. 235-256.

* cited by examiner

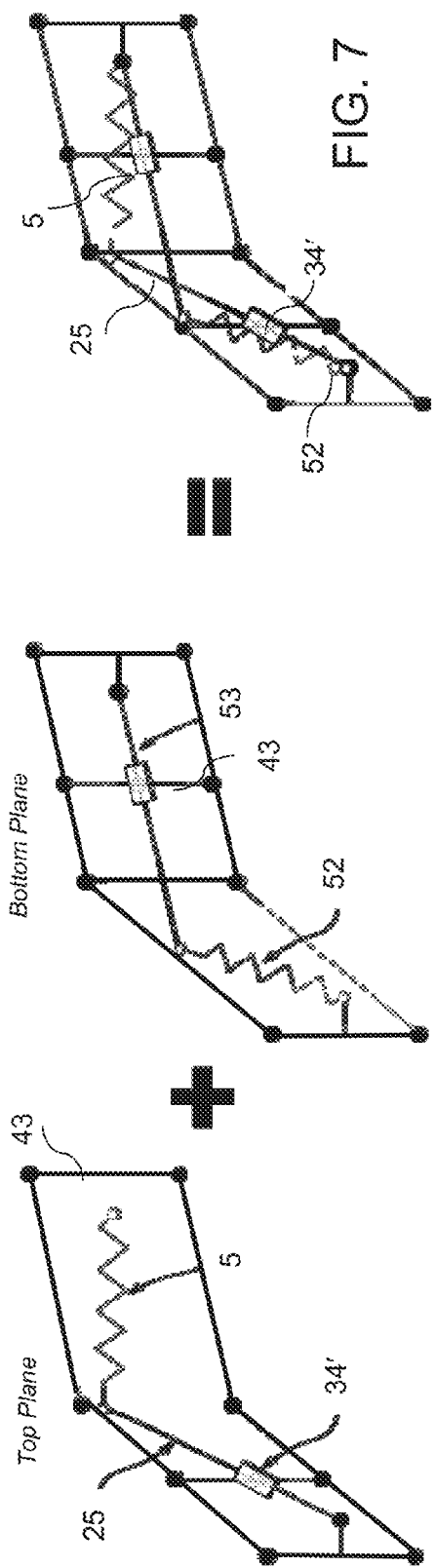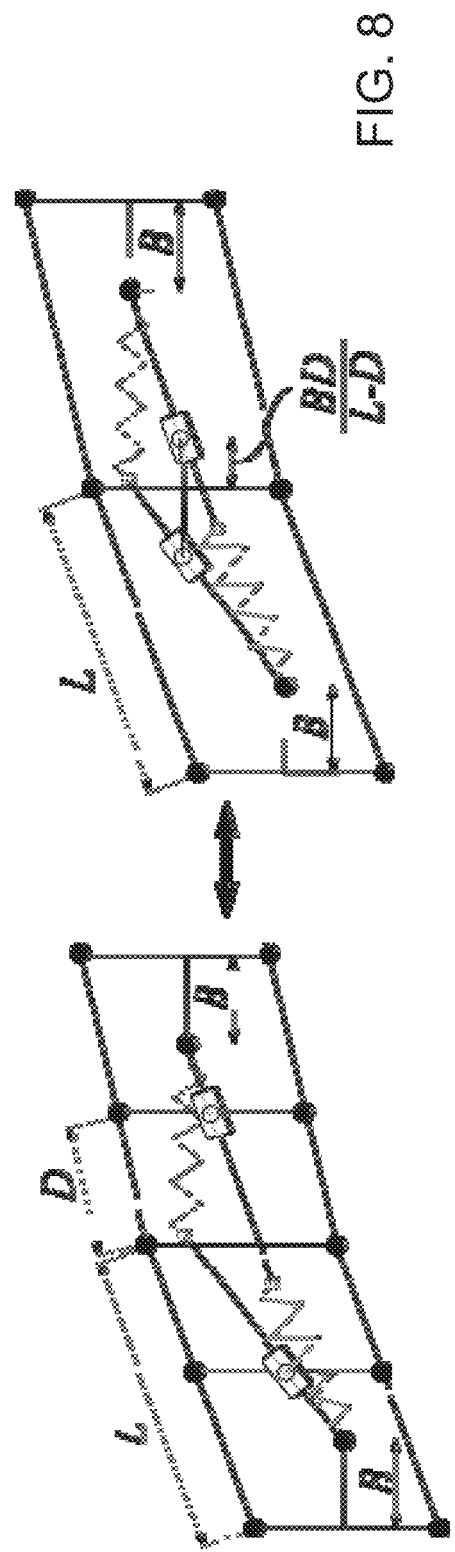

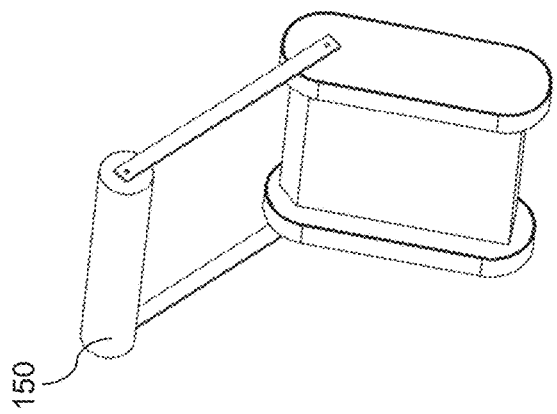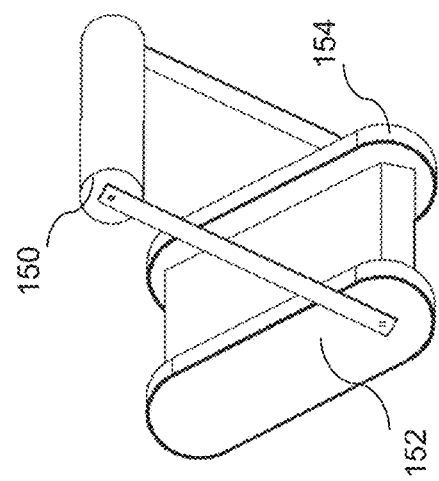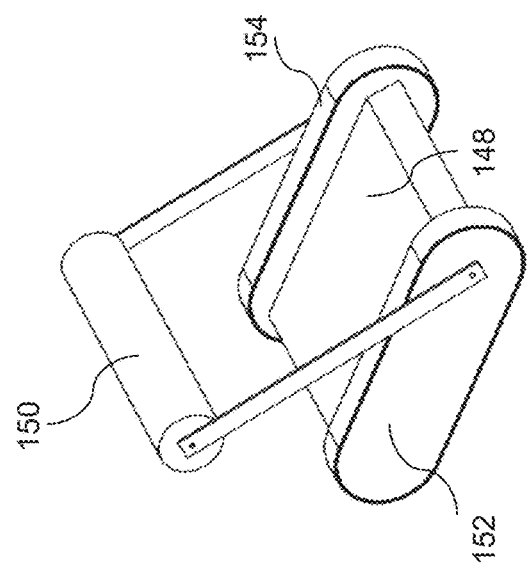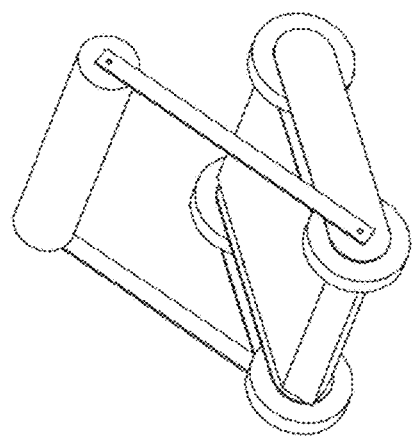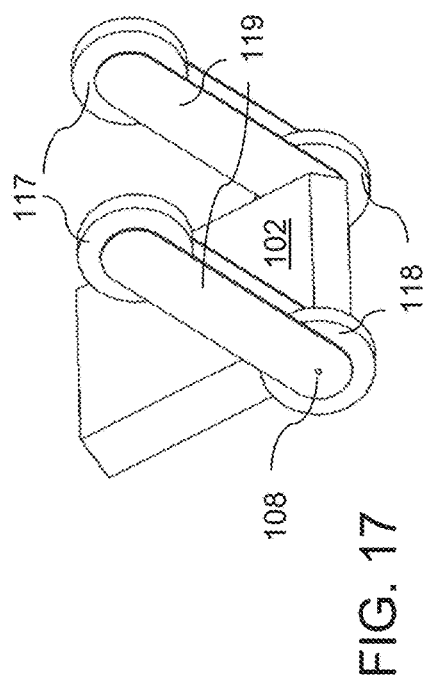
FIG. 16a
FIG. 16b
FIG. 16c
FIG. 17
FIG. 18

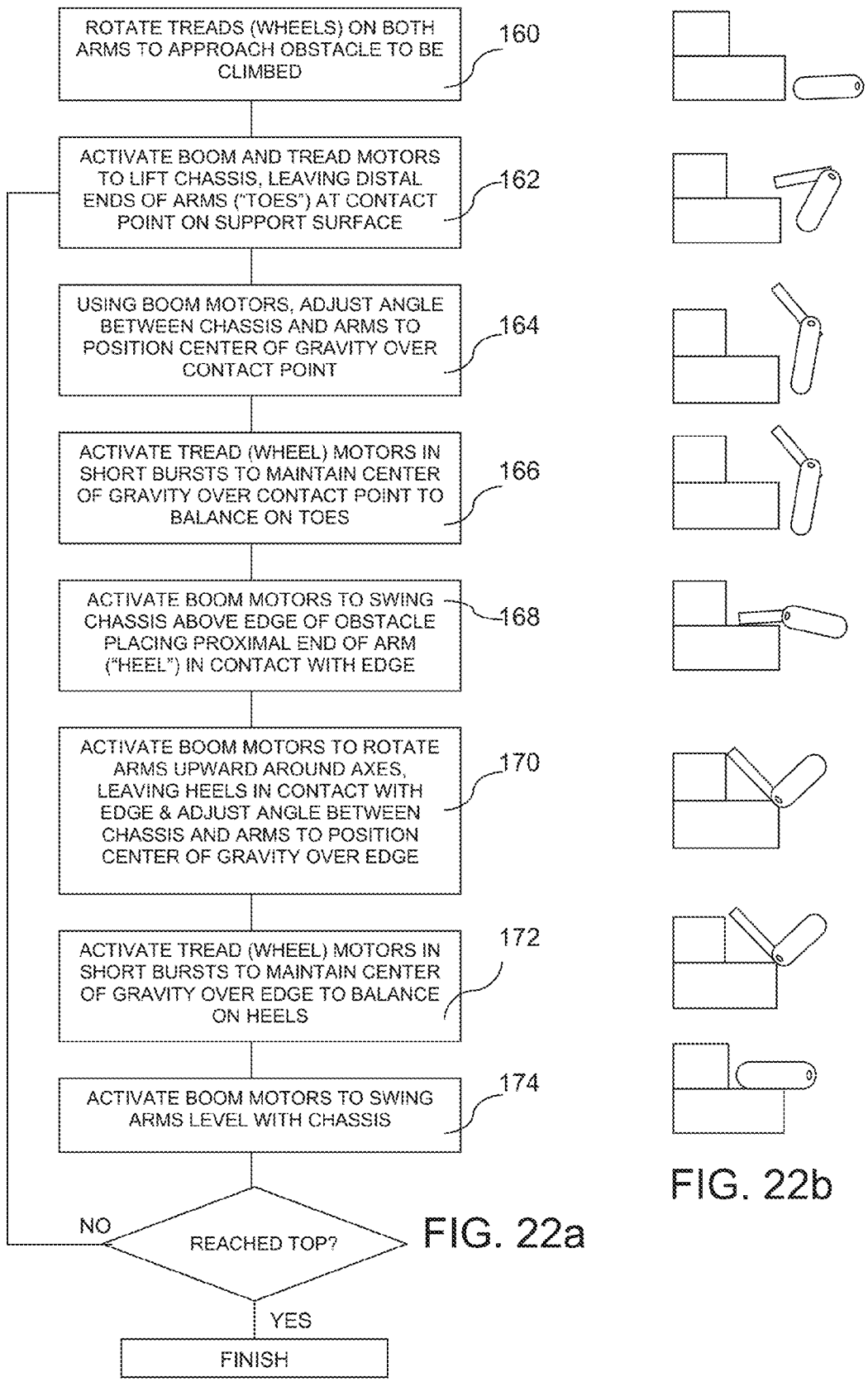

```
┌─────────────────────────────────┐
│ ROTATE TREADS (WHEELS) ON BOTH  │──160
│ ARMS TO APPROACH OBSTACLE TO BE │
│            CLIMBED              │
└─────────────────────────────────┘
              │
              ▼
┌─────────────────────────────────┐
│ ACTIVATE BOOM AND TREAD MOTORS  │──162
│ TO LIFT CHASSIS, LEAVING DISTAL │
│ ENDS OF ARMS ("TOES") AT CONTACT│
│      POINT ON SUPPORT SURFACE   │
└─────────────────────────────────┘
              │
              ▼
┌─────────────────────────────────┐
│ USING BOOM MOTORS, ADJUST ANGLE │──164
│   BETWEEN CHASSIS AND ARMS TO   │
│ POSITION CENTER OF GRAVITY OVER │
│         CONTACT POINT           │
└─────────────────────────────────┘
              │
              ▼
┌─────────────────────────────────┐
│ ACTIVATE TREAD (WHEEL) MOTORS IN│──166
│ SHORT BURSTS TO MAINTAIN CENTER │
│ OF GRAVITY OVER CONTACT POINT TO│
│         BALANCE ON TOES         │
└─────────────────────────────────┘
              │
              ▼
┌─────────────────────────────────┐
│ ACTIVATE BOOM MOTORS TO SWING   │──168
│ CHASSIS ABOVE EDGE OF OBSTACLE  │
│ PLACING PROXIMAL END OF ARM     │
│ ("HEEL") IN CONTACT WITH EDGE   │
└─────────────────────────────────┘
              │
              ▼
┌─────────────────────────────────┐
│  ACTIVATE BOOM MOTORS TO ROTATE │──170
│    ARMS UPWARD AROUND AXES,     │
│  LEAVING HEELS IN CONTACT WITH  │
│   EDGE & ADJUST ANGLE BETWEEN   │
│  CHASSIS AND ARMS TO POSITION   │
│    CENTER OF GRAVITY OVER EDGE  │
└─────────────────────────────────┘
              │
              ▼
┌─────────────────────────────────┐
│ ACTIVATE TREAD (WHEEL) MOTORS IN│──172
│ SHORT BURSTS TO MAINTAIN CENTER │
│ OF GRAVITY OVER EDGE TO BALANCE │
│           ON HEELS              │
└─────────────────────────────────┘
              │
              ▼
┌─────────────────────────────────┐
│  ACTIVATE BOOM MOTORS TO SWING  │──174
│    ARMS LEVEL WITH CHASSIS      │
└─────────────────────────────────┘
              │
              ▼
         ◇ REACHED TOP? ◇  FIG. 22a
          NO │        │ YES
             │        ▼
             │      FINISH
             └──(back to 162)
```

FIG. 22b

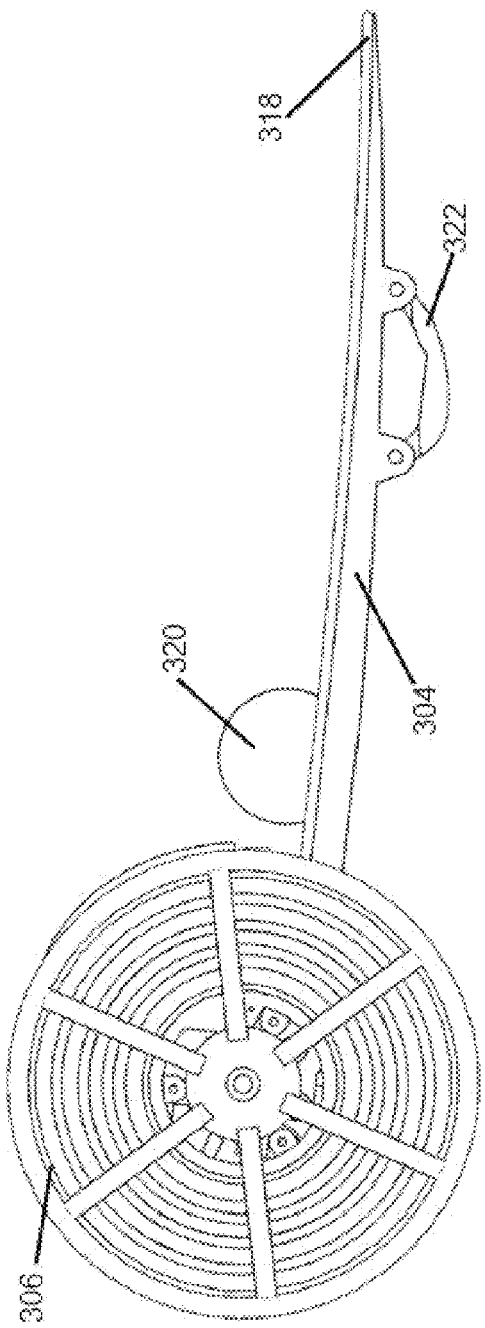
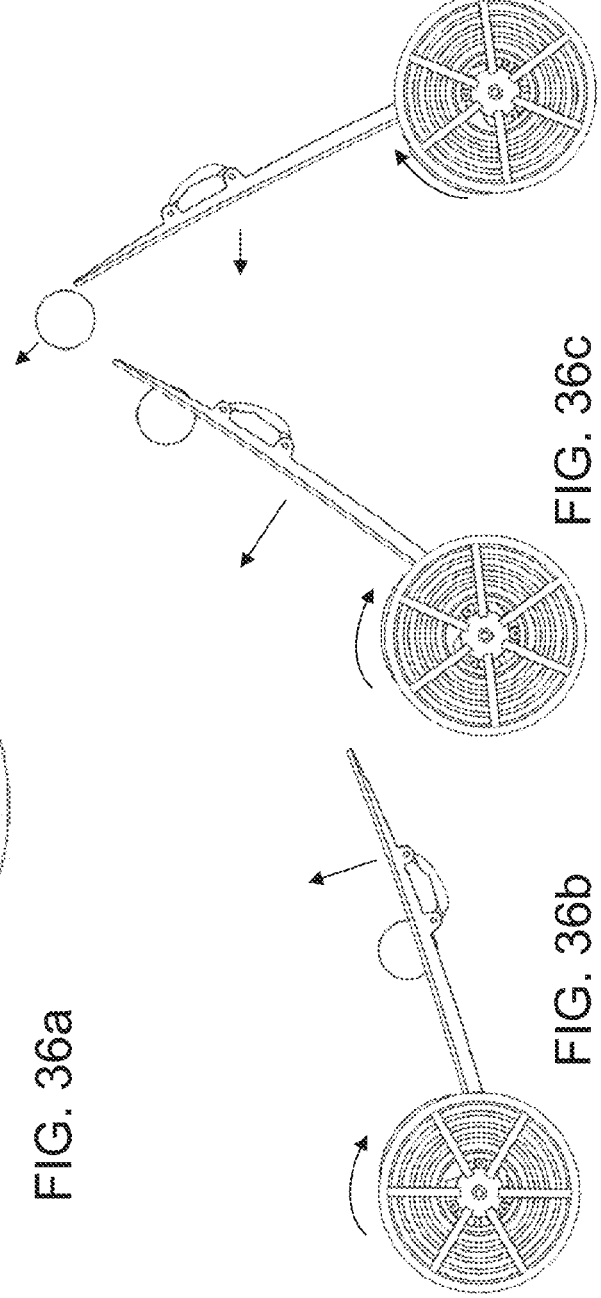
FIG. 36a  FIG. 36b  FIG. 36c  FIG. 36d

MULTIMODAL DYNAMIC ROBOTIC SYSTEMS

RELATED APPLICATIONS

This application is continuation of application Ser. No. 14/656,676, filed Mar. 12, 2015, issued as U.S. Pat. No. 9,757,855, which is a divisional of application Ser. No. 13/389,256, filed Mar. 15, 2012, issued as U.S. Pat. No. 9,020,639, which is a 371 national stage filing of International Application No. PCT/US2010/044790, filed Aug. 6, 2010, which claims the priority of U.S. Provisional Applications No. 61/231,672, filed Aug. 6, 2009, and No. 61/324,258, filed Apr. 14, 2010. Each of the foregoing applications is incorporated herein by reference in its entirety.

FIELD OF THE INVENTION

The present invention relates to robotic mechanisms that exhibit multimodal capability including rolling, hopping, balancing, climbing, and picking up and throwing objects. More particularly, the invention relates to multimodal dynamic robotic systems that can move and function efficiently on complex terrain and/or in harsh operating environments.

BACKGROUND OF THE INVENTION

Robots have been developed for applications ranging from material transportation in factory environments to space exploration. One area in which mobile robots have been widely adopted is in the automobile industry, where robots transport components from manufacturing work stations to the assembly lines. These automated guided vehicles (AGVs) follow a track on the ground and have the ability to avoid collisions with obstacles in their path. Autonomous mobile robots designed for planetary exploration and sample collection during space missions, such as NASA's Mars Exploration Rover, have also received significant attention in recent years. This attention has resulted in advancement of mobile robot technology and a corresponding increase in the effectiveness of mobile robots in a wide range of applications.

Mobile robot technology has primarily focused on robot designs having a body with wheels for mobility. This has led to advancements in motion planning and control of the rolling wheel. Notwithstanding these developments, wheeled mobile robots have significant deficiencies that have not been adequately overcome. For example, wheeled robots frequently have difficulty traversing rough terrain. While this problem may be reduced by increasing the size of the wheels of the robot, increases in wheel size cause various undesirable consequences including an increase in the overall size and weight of the robot. Further, increases in wheel sizes do not necessarily result in corresponding increases in operational features such as payload capacity. Also, wheeled robots can be adversely affected by harsh operating environments such as heat, chemicals, and the like.

A variation of a wheeled robot that addresses certain difficulties found in harsh environments is described in U.S. Patent Publication No. 2008/0230285 A1, which shares partial inventorship with the present application. The cited application, which is incorporated herein by reference, describes the first vehicle of its kind that combines efficient wheeled locomotion with a hopping capability. The multimodal robot adds hopping and climbing capability to a wheeled robot by attaching the axle to a central leg so that relative movement of the leg and axle can lift axle. A hopping action can be produced by applying sudden downward force to drive the leg against the support surface. Stair climbing is provided by applying a steady force against the support surface to allow the wheels to climb up the vertical riser. The leg also provides additional stabilization for movement across uneven terrain. In one embodiment, the multimodal robot's wheels are mounted on independently-moving axes that have independent parallelogram linkages to permit the wheels to change relative orientations and tilt.

One alternative to the wheeled robot is the rolling robot. A rolling robot is one that rolls on its entire outer surface rather than on external wheels or treads. They tend to be spherical or cylindrical in form and have a single axle, if any axle at all, and an outer surface that is fully involved in the robot's movement. State-of-the-art rolling robots are all based on the principle of moving the center of gravity of a wheel or sphere, which causes the wheel or sphere to fall in the direction of movement and thus roll along. Rolling robots have a number of advantages over wheeled robots including that the components of the robot are enclosed within a shell, so there are no extremities to hang-up on obstacles, they don't fall over, they can travel on soft surfaces, including water, and they can move in any direction and turn in place.

Improvements in methods of locomotion are needed to allow robotic systems to move within environments that are difficult or impossible for currently-used robot locomotion designs to traverse. The following description discloses such improvements.

BRIEF SUMMARY

It is an advantage of the present invention to provide a multimodal robot that can move and function efficiently on complex terrain and/or in harsh operating environments.

In an exemplary embodiment, the robotic systems according to the invention include a frame or body with two or more wheels rotatably mounted on the frame or body and a motor for independently driving each wheel. A system controller generates a signal for actuating each motor based on information provided by one or more sensors in communication with the system controller for generating feedback signals for providing reactive actuation of the motors for generating one or more functions selected from the group consisting of forward motion, backward motion, climbing, hopping, balancing, and throwing. A power source is included for providing power to operate the drive motors, system controller and the one or more sensors.

In one aspect of the invention, a robotic system according includes a frame with two or more wheels rotatably mounted thereon and a motor for independently driving each wheel. A system controller generates a signal for actuating each motor based on information provided by one or more sensors in communication with the system controller for generating feedback signals for providing reactive actuation of the motors for generating one or more functions selected from the group consisting of forward motion, backward motion, climbing, hopping, balancing, and throwing. A power source is included for providing power to operate the drive motors, system controller and the one or more sensors. The frame includes two arms, each having a distal end on which a wheel is mounted and a proximal end and a leg centrally disposed between the two arms with the proximal end of each arm rotatably attached to the leg. An arm motor is disposed on each arm for independently driving rotation of the arm relative to the leg, so that when the leg is disposed in a vertical orientation with an end of the leg in contact with a support surface, (i) downward symmetrical rotation of the arms positions the wheels in contact with the support surface for wheeled locomotion on the support surface, (ii) rapid upward symmetrical rotation of the arms lifts the leg off of the support surface to produce a hopping motion; and (iii) antisymmetrical rotation of the arms balances the frame on the end of the leg.

In another aspect of the invention, a robotic system according includes a body with two or more wheels rotatably mounted thereon and a motor for independently driving each wheel. A system controller generates a signal for actuating each motor based on information provided by one or more sensors in communication with the system controller for generating feedback signals for providing reactive actuation of the motors for generating one or more functions selected from the group consisting of forward motion, backward motion, climbing, hopping, balancing, and throwing. A power source is included for providing power to operate the drive motors, system controller and the one or more sensors. The body comprises a chassis having two drive wheels rotatably mounted on opposite sides thereof, each drive wheel disposed on an axle that is rotated by a corresponding drive motor for rotating the drive wheel. A pair of elongated arms is rotatably mounted on opposite sides of and perpendicular to the chassis, each arm having a proximal end disposed on a corresponding axle, and a distal end, on which a second wheel is mounted in a common plane with the corresponding drive wheel. A second motor is associated with each arm, and a linkage between the second motor and the axle for each arm causes the second motor, when activated, to rotate one of the chassis and the corresponding arm relative to the other. Independent activation of the second motor of both arms to rotate the arms symmetrically relative to the chassis shifts a center of gravity for balancing on one of the distal end or proximal end of the arms. The linkage between the second motor and the axle for each arm and a linkage between the drive motor and the drive wheel can be incorporated into a two-degree of freedom joint. In one embodiment, each arm supports a track.

In still another aspect of the invention, a robotic system according includes a body with two or more wheels rotatably mounted thereon and a motor for independently driving each wheel. A system controller generates a signal for actuating each motor based on information provided by one or more sensors in communication with the system controller for generating feedback signals for providing reactive actuation of the motors for generating one or more functions selected from the group consisting of forward motion, backward motion, climbing, hopping, balancing, and throwing. A power source is included for providing power to operate the drive motors, system controller and the one or more sensors. The body comprises a chassis having two drive wheels rotatably mounted on opposite sides thereof, attached to a corresponding drive motor for rotating the drive wheel. A pair of elongated drive arms is rotatably mounted on opposite sides of and perpendicular to the chassis, with each drive arm having a proximal end disposed on a corresponding axle, and a distal end which supports a second wheel in a common plane with the corresponding drive wheel. A boom arm comprising a weighted portion attached to connector arms that are pivotably mounted on each side of the chassis so that the weighted portion is disposed parallel to the chassis. At least one second motor is connected to the connector arms by a linkage such that activation of the at least one second motor rotates one of the chassis and the boom arm relative to the other. Independent activation of the at least one second motor shifts a center of gravity for balancing on one of the distal end or proximal end of the drive arms. The system controller controls the drive motors and the at least one second motor to reactively shift the center of gravity for stability. In one embodiment, each arm supports a track.

In another aspect of the invention, a robotic system according includes a frame with two or more wheels rotatably mounted thereon and a motor for independently driving each wheel. A system controller generates a signal for actuating each motor based on information provided by one or more sensors in communication with the system controller for generating feedback signals for providing reactive actuation of the motors for generating one or more functions selected from the group consisting of forward motion, backward motion, climbing, hopping, balancing, and throwing. A power source is included for providing power to operate the drive motors, system controller and the one or more sensors. The two or more wheels comprise a plurality of reaction wheels and the motor for driving each reaction wheel is disposed within a housing to define a plurality of momentum exchange elements mounted on one or more axes attached to the frame. The frame comprises a geometrical structure which allows the plurality of momentum exchange elements to be distributed about the frame to individually or simultaneously generate angular momentum in a plurality of different directions. In one variation, the one or more axes comprise a single gimbal axis, each having a corresponding gimbal motor. In another variation, the one or more axes comprise a double gimbal axis, each having two corresponding gimbal motors. A shell may be provided to enclose the frame and momentum exchange elements.

In yet another aspect of the invention, a robotic system includes a body with two or more wheels rotatably mounted thereon and a motor for independently driving each wheel. A system controller generates a signal for actuating each motor based on information provided by one or more sensors in communication with the system controller for generating feedback signals for providing reactive actuation of the motors for generating one or more functions selected from the group consisting of forward motion, backward motion, climbing, hopping, balancing, and throwing. A power source is included for providing power to operate the drive motors, system controller and the one or more sensors. The body is configured as a cylinder having a rotational axis, the cylinder having two ends, each end defining a hub having an axle aligned with the rotational axis for rotatably retaining a wheel, the body having a cavity therein defining a storage volume for retaining an object having an object diameter. An elongated arm extends away from the body perpendicular to the rotational axis so that a base portion of the elongated arm is in communication with the storage volume. A lower body portion opposite the elongated arm is symmetrical along a plane bisecting the cylinder. A curved channel is located on each side of the bisecting plane with an exit end in communication with the storage volume and an entrance end defined by the hub, the lower body portion and an inner surface of the wheel. Each channel has a dimension for receiving the object to produce a frictional contact between the inner surface of the wheel, the hub and the lower body portion, so that rotation of the wheel draws the object into the channel and into the storage volume. The drive motors are adapted for rotating the body relative to the wheels so that the elongated arm can be oriented in a horizontal position. With the elongated arm oriented in a horizontal position, rapid activation of the motors rotates the corresponding wheels in a first direction causing the body to rotate around the rotational axis in an opposite direction to rapidly accelerate the horizontal arm toward a vertical position. An object disposed on the base portion of the elongated arm rolls toward a distal end of the arm as the elongated arm accelerates toward the vertical position, causing the object to be thrown when the object reaches the distal end of the arm.

In a first exemplary embodiment, enhanced mobility within a harsh environment, which may include rough terrain or hazards, is provided in a modification of a wheeled robot which combines a hopping ability with a leaning maneuver. The inventive robot includes end-over-end stair climbing capability, which involves raising its center of mass above the obstacle while balancing the vehicle on its toe and shifting the mass of the drive wheels side-to side for balance.

The robot of the first embodiment comprises two independently driven wheels mounted on the ends of two independently driven arm assemblies which pivot about a central leg to produce both symmetric and anti-symmetric rotation, depending on the motion desired. The arm assemblies are adapted to linearly travel along the length of the leg via a non-backdriveable motorized lead screw. This gradual linear motion allows the vehicle to transition between an upright roving configuration and a toe-balancing configuration.

The independently-actuated arms can function both as a hopping mechanism when rotated symmetrically about the central leg, and as an actively-controlled roll-axis stabilizer when rotated anti-symmetrically relative to the central leg. Appropriate superposition of these two motions allows the robot to simultaneously stabilize and hop in the roll axis plane.

The multimodal robot of the present invention improves upon previous designs by leveraging a highly-efficient leaning maneuver while retaining the hopping capabilities necessary to overcome other obstacles, including jumping onto a raised platform or across a gap, or quickly traversing flames or other hazards that could damage a slower-moving robot.

Applications for the multimodal robot of the first embodiment include reconnaissance in burning or chemical-contaminated environments, monitoring hazardous materials (e.g. nuclear waste stockpiles), providing mobile platforms for weapons, planetary exploration, and for incorporation in toys.

A second embodiment of a multimodal robot combines rolling, balancing and climbing capabilities in a wheeled or treaded vehicle by changing the vehicle's center of gravity relative to its chassis. These multiple modes of operation allow the vehicle to perform and stabilize "wheelies" and "reverse wheelies" (also known as "stoppies"). In an exemplary embodiment, the robot is capable of overcoming obstacles nearly as tall as the vehicle is long (in its folded configuration) by reconfiguring itself to adjust its center of gravity. A platform or frame is preferably connected to the chassis to carry a payload, sensors, cameras or other electronic devices. In a preferred configuration, motors that drive the treads or wheels are capable of independent rotation with respect to the chassis, so that the treads or wheels may be used in both the rolling and balancing functions. This allows the robot to dynamically adjust its center of gravity. MEMS accelerometers and gyroscopes, coupled with advanced filtering techniques, allow the robot to estimate its angle with respect to gravity. With the tread assemblies unfolded away from the body, the robot can balance upright on its treaded "toes" and stand up in order to expand the view of an onboard camera (or other sensors) and overcome obstacles that would otherwise be insurmountable with a treaded robot that is of the same height as the robot in its conventional treaded mode. This design is also capable of both crossing chasms nearly as wide as the vehicle is long, and using the front-mounted pivot of the chassis to actively dampen vibrations when driving quickly over rough terrain. The reconfigurability of the tread assemblies permits several modes of locomotion, which can be selected to adapt the robot to the type of terrain encountered. The unique mechanical design of this multimodal robot coupled with feedback control algorithms enables it to overcome complex terrain (e.g. stairs, rubble) while retaining a small form factor to navigate in confined spaces and to reduce cost and weight.

In an alternative configuration, an actuated boom is included to facilitate balancing and climbing. The boom has significant mass, approximately equal to the mass of the chassis. Motors are configured on the robot to drive the treads (or wheels) and to change the angle of the boom with respect to the chassis. Sensors are integrated to detect the robot's configuration, including one or more level sensors along each axis, which provide signals to a system controller. Feedback may be applied to enable the vehicle to balance on its front or rear treaded toes (or wheels). The vehicle can also climb obstacles (including stairs) by extending the mass of the boom over the obstacle and rotating the chassis up and over. This maneuver may be done in a statically stable manner or in a dynamically balanced manner. The boom arm may be extensible and/or may be configured with its own wheels or treads, The shifting of the robot's center of gravity allows it to overcome obstacles nearly as tall as the vehicle is long (in its folded configuration) by repositioning its boom arm.

Applications of this multimodal robot include building, cave, and mine exploration; search and rescue; monitoring hazardous materials (e.g. nuclear waste stockpiles); improvised explosive device (IED) detection and disposal; weapons platform; toy; planetary exploration; HVAC system monitoring.

In a third embodiment, motion in harsh operating environments and uneven terrain is provided by a spherical robot that incorporates momentum exchange devices to achieve rapid acceleration or deceleration in any direction.

The inventive spherical robot can efficiently traverse a wide variety of terrain including, but not limited to: carpet, pavement, sand, gravel, and mud. In addition, it can incorporate an amphibious capability which allows it to traverse mud, swamp, and open water. Unlike existing spherical robots, the internal frame of the present embodiment is fixed to the external sphere and the center of mass of the robot remains fixed to the center of the sphere. In an exemplary embodiment, single-gimbaled control moment gyroscopes (CMGs) are used for momentum exchange. This design is especially agile, as the momentum needed to maneuver is stored within the CMGs and, thus, does not need to be generated by high-torque (and large electrical power-consuming) motors like a standard direct drive system.

In one embodiment, a cubical frame is populated with four single-gimbal CMGs, with each gimbal axis at an angle on each face. A plurality of other momentum exchange devices such as reaction wheels, dual-gimbal CMGs, or momentum wheels may be incorporated as alternatives to the single-gimbal CMGs. The robot is not limited to spheres as an outer structure, but to all generalized amorphous ellipsoidal configurations as well.

In military applications, the inventive spherical robot can be used in covert reconnaissance or munitions delivery. For the general commercial applications, the robots can be a toy or a therapeutic device.

The fourth embodiment of the multimodal robot is a wirelessly-controlled or autonomous vehicle which is an all-in-one system of ball retrieval, storage and throwing. The design includes an integrated ball pick up mechanism and the jai alai style throwing arm design.

To enable ball pick up, the body and wheels of the robot are spaced to provide automatic pickup and loading of the target balls. This method allows the operator to drive the robot toward the target, with the curvature of the robot directing the ball into the space between the wheel and the body. The rotation of the wheel brings the ball up to be stored within a basket or other storage receptacle.

For throwing, the robot is stabilized by a feedback control circuit to balance upright as an inverted pendulum. The great rotational inertia of the wheels allows the robot to rotate the body quickly from a lay-down mode to an upright mode. The rapid rotation results in the effective toss of a light weight ball. The ball is imparted with a spin as it rolls off the throwing arm track. The result is a more stable and longer throw.

The potential applications of the present robot embodiment include remote controlled toy cars, an automatic tennis ball retrieval system, and a grenade launcher, among others.

BRIEF DESCRIPTION OF THE DRAWINGS

FIG. 1b is a detail view of the circled area in FIG. 1a.

FIG. 5a shows a hopping motion; and FIG. 5b shows asymmetric arm motion for stabilization about the roll axis.

FIG. 7 diagrammatically illustrates a self-locking arm suspension mechanism.

FIG. 8 diagrammatically illustrates an alternative embodiment of the arm suspension mechanism.

FIG. 15a shows the robot in a heel-balancing position, FIG. 15b shows the robot in a toe-balancing position, and FIG. 15c showing the robot with its treads extended for reaching across and spanning a gap, or for climbing.

FIGS. 16a-16c illustrate an alternative configuration of the multimodal robot of FIG. 14, in which an actuated boom is used to shift the robot's center of gravity.

FIG. 17 illustrates an alternative configuration of the multimodal robot of FIG. 14 in which the treads are replaced with wheels.

FIG. 18 illustrates an alternative configuration of the multimodal robot of FIG. 16a.

FIG. 20a shows the robot in a horizontal skid steer configuration; FIG. 20b shows the robot in a "chasm-crossing" configuration; FIG. 20c shows the robot in a vertical "C-balancing" configuration; and FIG. 20d shows the robot in a vertical "V-balancing" configuration.

FIG. 21a is a perspective view of the robot maneuvering within a duct, and FIG. 21b is a perspective view of the robot perching on the edge of a stair step.

FIG. 22a illustrates a sequence of steps in a climbing operation performed by the robot of FIG. 14.

FIG. 22b diagrammatically illustrates actions executed by the robot corresponding to the sequence of steps shown in FIG. 22a.

FIG. 24a illustrates a reaction wheel assembly; FIG. 24b shows a single gimbal control moment gyro; and FIG. 24c illustrates a double gimbal control moment gyro.

FIGS. 29a and 29b show examples of motion of the robot in a free-surface case and a near-a-surface case, respectively; and FIG. 29c is a series of cartoons showing the steps of a process for coordinating multiple spherical robots to overcome an obstacle.

FIGS. 36a-36d are side views of the robot showing the throwing sequence, where FIG. 36a shows the ball at the lower portion of the throwing arm; FIG. 36b shows the beginning of the body rotation to move the ball to a mid-point of the throwing arm; FIG. 36c shows the ball at the upper portion of the throwing arm; and FIG. 36d shows the ball after release.

DETAILED DESCRIPTION OF THE EMBODIMENTS

The following description of four embodiments of multimodal robots provide details of functions including locomotion via rotation of wheels or tracks and spherical rotation, hopping, climbing, and throwing. While the different embodiments may use different locomotion means, the common feature among all embodiments is their use of feedback to control angular momentum to enable active balancing and effect changes in orientation and movement of the robots, resulting in vehicles that can be used in a wide range of applications from military and industrial applications to toys.

First Multimodal Robot Embodiment

Figure 1A:
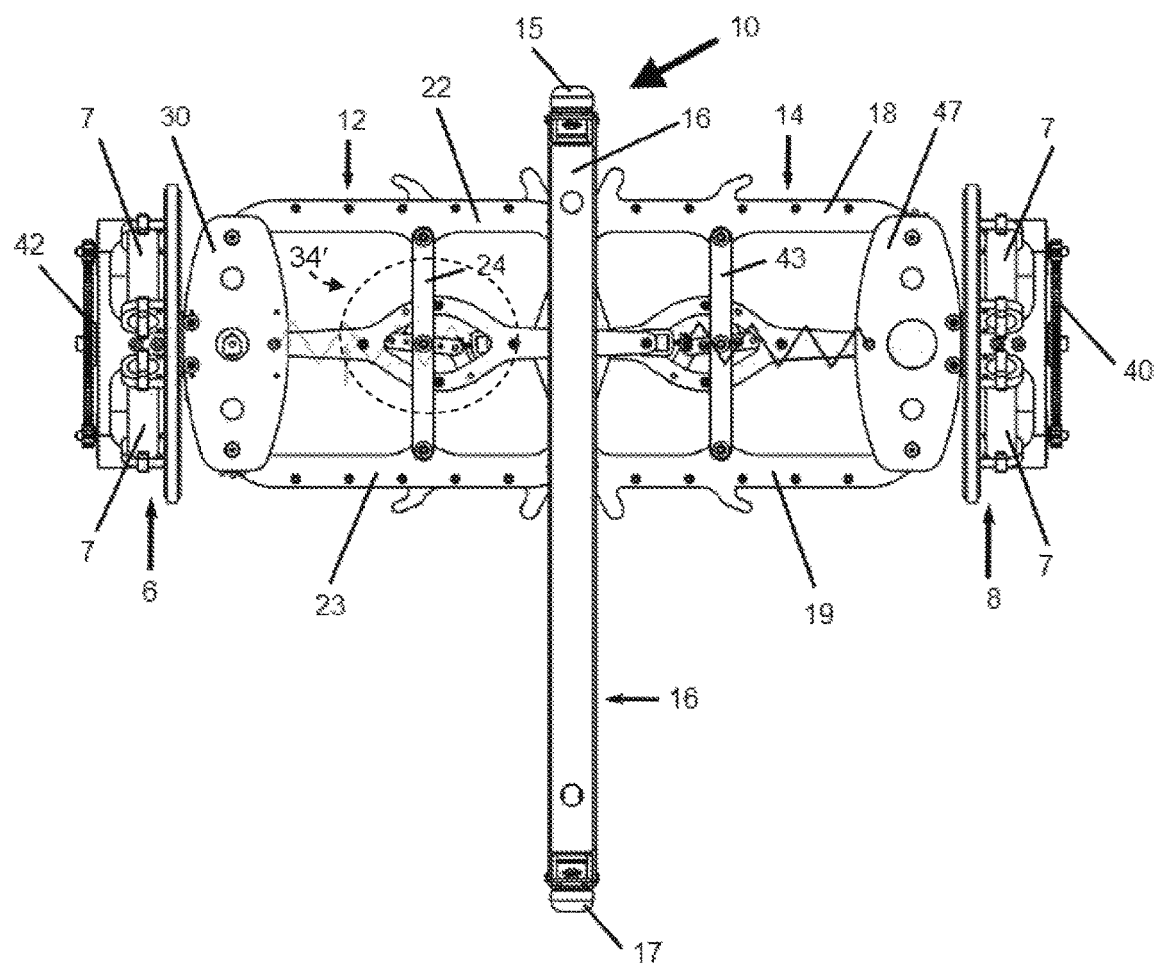
FIG. 1a is a diagrammatic front view of a first embodiment of a multimodal robot.
Figure 1B:
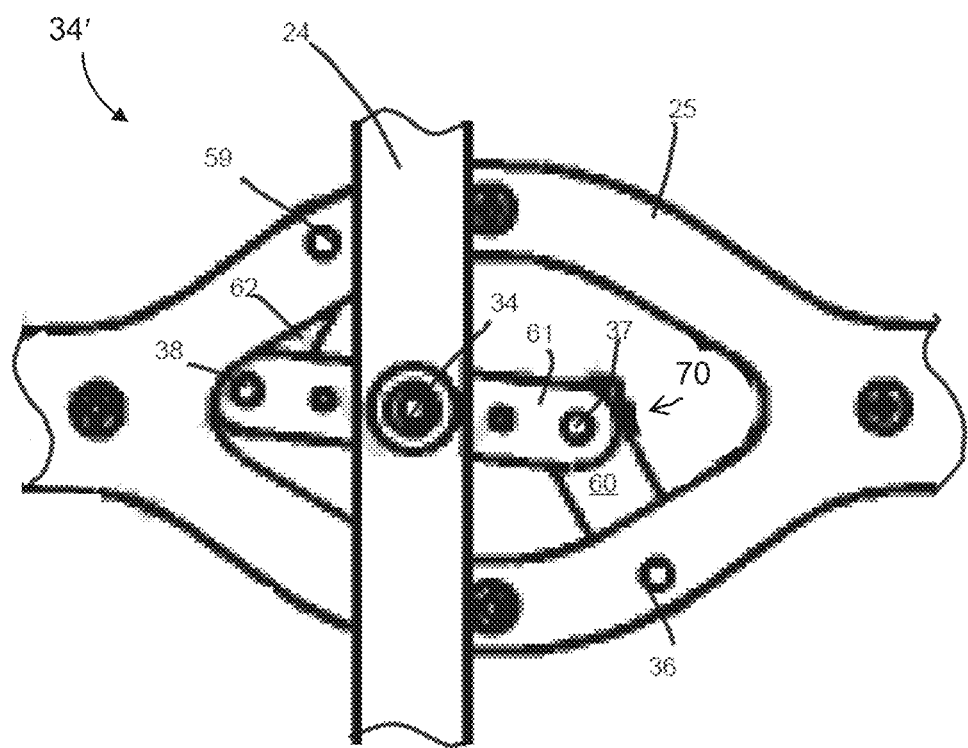
Figure 2:
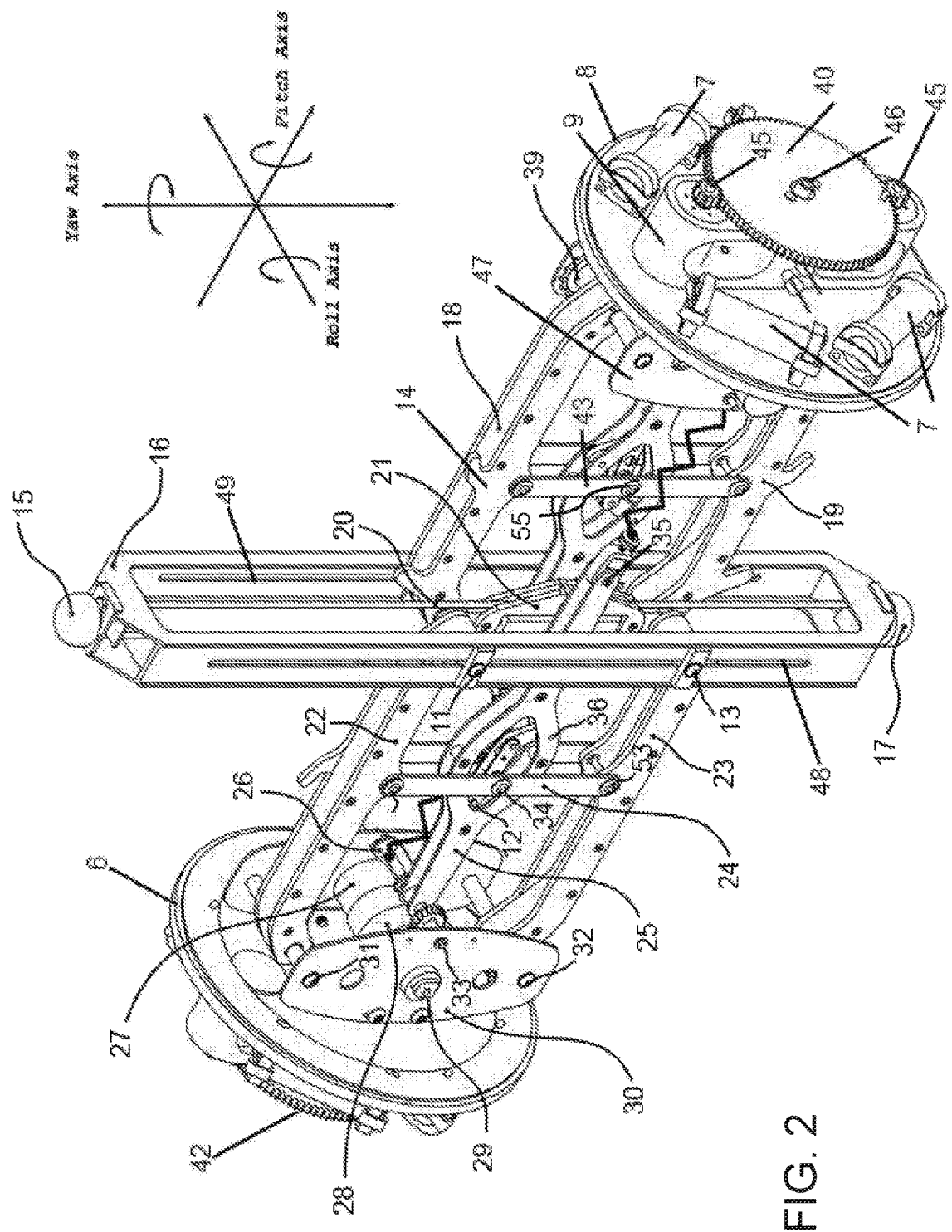
FIG. 2 is a diagrammatic perspective view of the hopping robot of FIG. 1.
Figure 3:
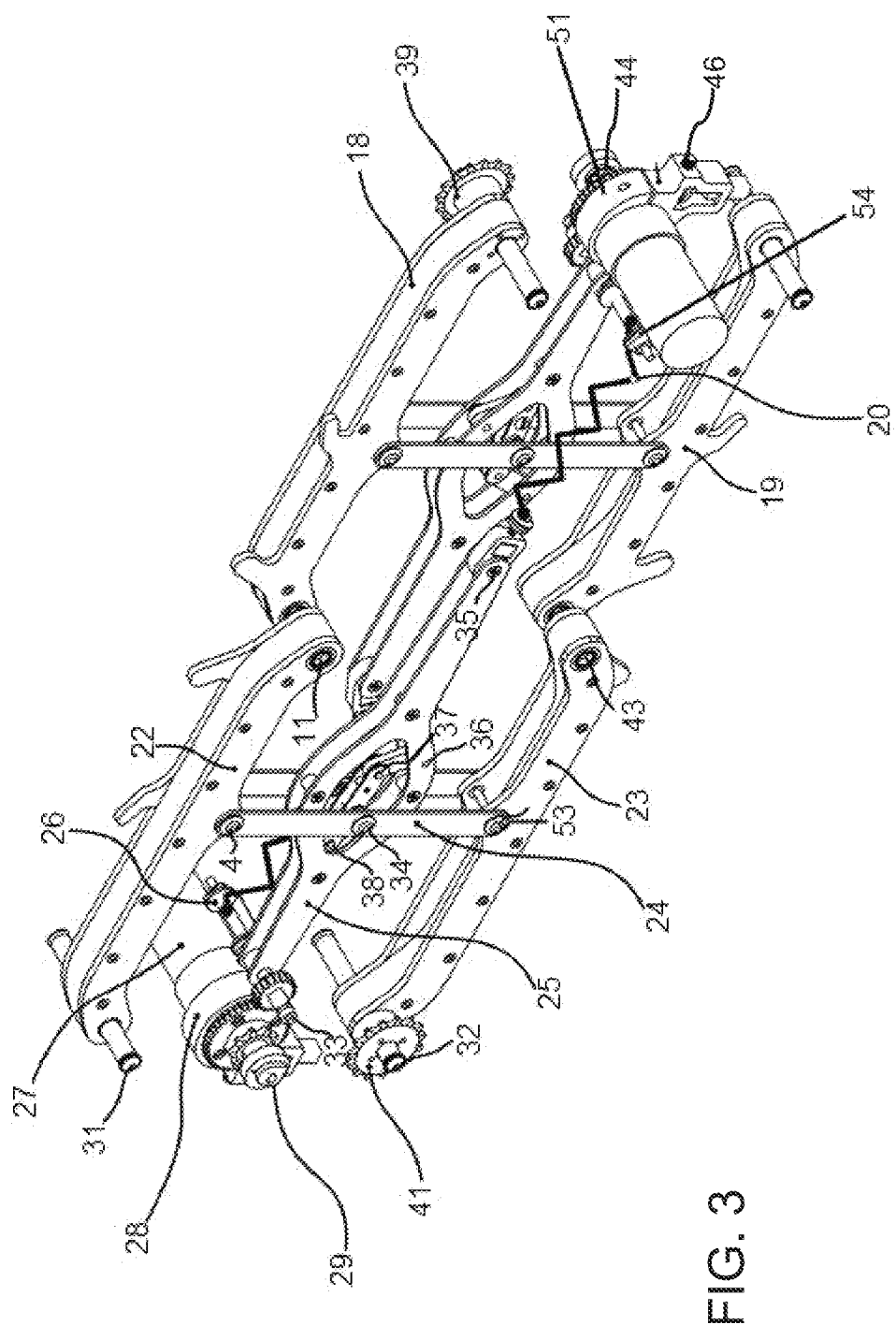
FIG. 3 is a diagrammatic perspective view of the arm assemblies of the hopping robot.

Referring initially to FIGS. 1-3 and 6, the robot 10 of the first embodiment (which may also be referred to herein as a "vehicle") includes two independently driven wheels 6, 8 mounted on the ends of two independently driven arm assemblies 12, 14 that pivot about central leg/shaft 16. The arm assemblies 12, 14 travel linearly along the length of leg 16 by way of a non-backdriveable motorized leadscrew 20. The gradual motion provided by the screw 20 allows the vehicle 10 to transition between an upright roving configuration and a toe-balancing configuration (on toe 15 or 17 at the ends of leg 16). FIG. 2 illustrates the three rotational axes around which the inventive robot moves, with leg 16 corresponding to the yaw-axis, the axles of the drive wheels corresponding to the pitch-axis, and the arm carrier 21, to the extent that it defines the midpoint in the arm assembly, corresponding to the roll-axis.

Referring to FIG. 2, arm assemblies 12, 14 are linked to a central arm carrier 21 via joints 11 and 13, which extend through leg guide channels 48 and 49. The arm carrier 21 is driven linearly along the leg 16 via a leadscrew powered by motors within the arm carrier to move joints 11 and 13 along the lengths of the guide channels.

Left arm assembly 12 includes a parallelogram linkage, which has the basic "frame" elements of a top left arm 22, bottom left arm 23, left arm end link 30 and left arm mid-link 25. Similarly, right arm assembly 14 includes the frame element of top right arm 18, bottom right arm 19, right arm mid-link 50 and right arm end link 47. The frame elements of the arms are preferably formed from a lightweight but relatively rigid metal, such as aluminum or titanium. Alternatively, the frame elements may be formed from a strong, rigid plastic or other polymer. The joints and drive mechanisms that connect and allow manipulation of the frame basic elements are described in more detail below.

The top left arm 22 attaches to the arm carrier 21 via joint 11, which attaches to the left arm end-link 30 via joint 31. The bottom left arm 23 is attached to left arm end-link 30 via joint 32 and to the arm carrier 21 via joint 13. The left arm mid-link 24 attaches to the top left arm 22 via joint 4, and to the bottom left arm via joint 3. In all cases, the joints described herein are revolute joints.

The left spring lever 25 is attached to the left arm assembly via joints 33 and 34. As illustrated, joint 34 is horizontally offset from the midpoint of a line connecting joints 31 and 32. The attachment between the spring lever 25 and joint 34 consists of a standard revolute joint coaxial with joint 34. Joint 34 attaches to either a linear bearing (free to travel along the line connecting the endpoints of the spring lever 25) affixed to the spring lever, or to a straight-line "Watts" linkage 70, details of which are shown in FIG. 1b, consisting of the links 60, 61 and 62 and connecting joints 36, 37, 38 and 59. The arm assembly 12 will not move if the spring lever 25 attaches directly to joint 34 without some form of linear bearing/prismatic joint or straight-line linkage. Left spring lever 53 is attached to the right arm assembly via joints 55 and 56 in conjunction with a similar Watts linkage.

The left arm assembly 12 is actuated via torque applied to left chain drive sprocket 41 at joint 32. Sprocket 41 engages the output shaft 29 of the arm motor 27, which is centrally mounted within the left arm end-link 30. The right arm assembly 14 is similarly actuated, with right chain drive sprocket 39 engaging the output shaft (not shown) of right arm motor 51, which is mounted within right arm end link 47.

Two extension springs 5, 52 connect the two arm assemblies. Left spring 52 connects the proximal end of the left arm spring lever 25 at joint 35 to the right spring pre-tension pulley 54 (visible in FIG. 3) of the right assembly. Similarly, right spring 5 extends between the proximal end of the right arm spring lever 53 and the left spring pre-tension pulley 26. Spring tension may be adjusted by rotating the spring pretension pulleys 26, 54 in the appropriate direction. Such adjustment can be accomplished by applying torque via the arm motors 28, 51 while their respective arm motor clutches 28, 44 are disengaged. Since the arm motor output shaft 29 (right shaft not shown) has a finite range of travel, this will eventually result in rotation of the arm motor body 28, 51, which engages the respective spring pre-tension pulley 26, 54 via a single-stage spur gear transmission.

Figure 4:
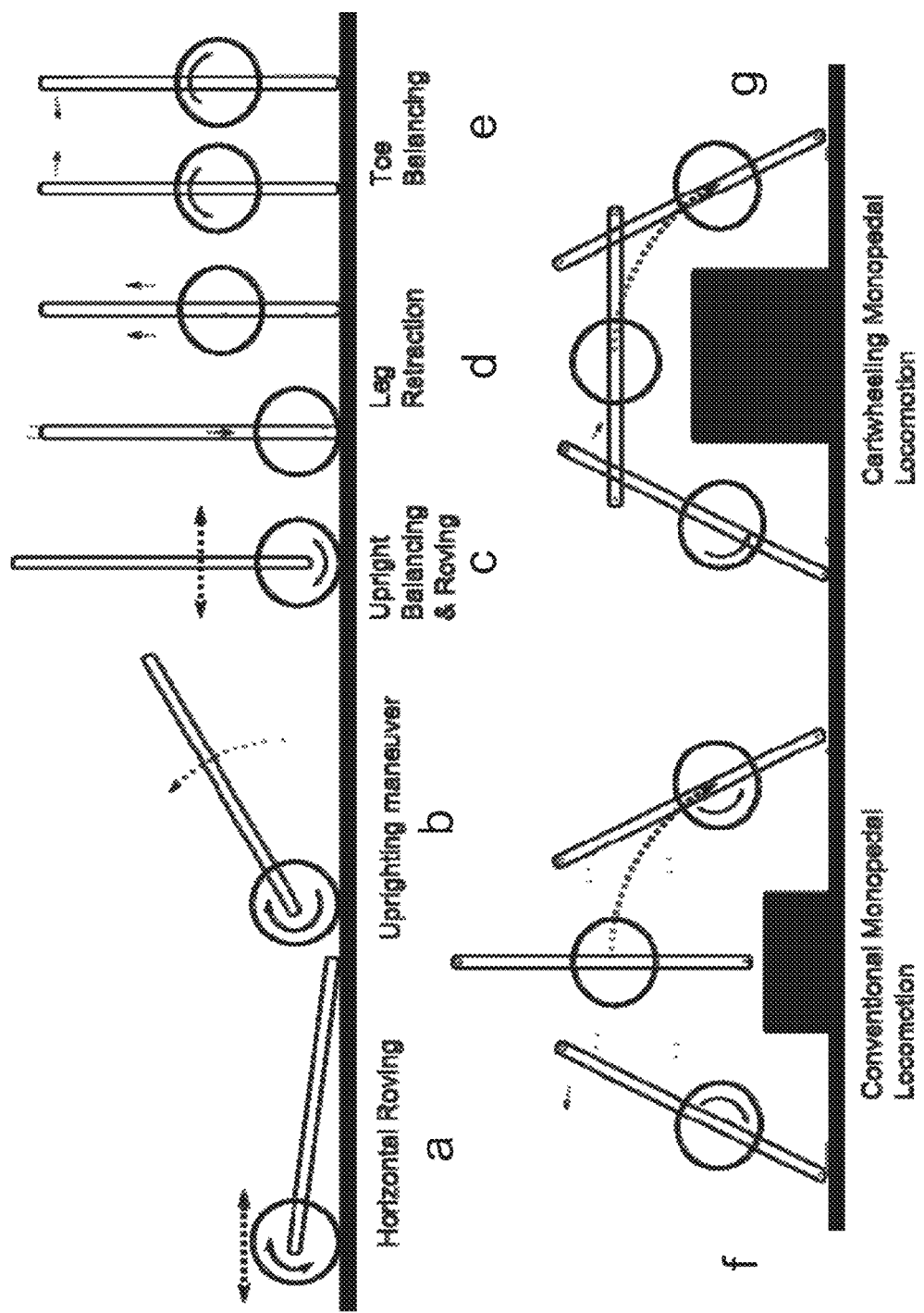
FIG. 4 is a series of cartoons illustrating the modes of operation of the robot of FIG. 1.
Figure 13:
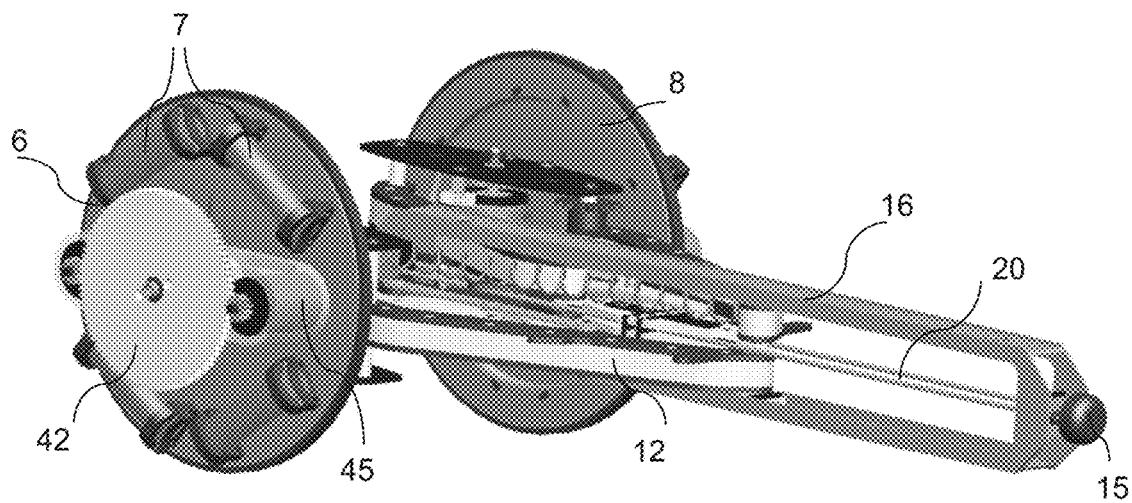
FIG. 13 is a perspective view of the first robot embodiment in a horizontal roving configuration.

FIG. 4 illustrates possible modes of operation of the inventive robot. Using the combination of the independently-driven wheels 6, 8, the leadscrew 20 and the independently actuated arms 12, 14, the robot can use one or a combination of motions to perform useful functions during operation of the vehicle. Horizontal roving (a) is effected when the left and right drive wheels are rotated in the same direction to tilt the leg forward. The wheels continue driving in the same direction to move the vehicle forward with the end of the leg on the support surface. To steer, the wheels may be operated in opposition to each other. The independent operation of the wheels allows the robot to be turned quickly on a point, or with a very small turning radius. As can be seen in the perspective view of FIG. 13, horizontal roving mode gives the vehicle a low vertical profile, allowing it to pass easily beneath low obstacles, such as fences, wires, or low shrubs, and to avoid optical sensors that may be positioned several inches or more above the floor or support surface.

An uprighting maneuver (b) from the horizontal roving mode involves applying a sudden strong torque to the wheels in the appropriate direction. When reaction wheels are torqued in one direction, the vehicle experiences an equal-and-opposite reaction torque. As illustrated, a strong clockwise torque induces a counter-clockwise rotation of the leg to rotate the leg into a vertical position. The motion of the reaction wheel itself can later be bled back off, either with reaction control thrusters, or merely when the vehicle comes back in contact with the support surface. The instantaneous torque available when using reaction wheels is limited to that provided by the motor used to drive the reaction wheels themselves. In the upright mode, the robot drives only on the reaction wheel wheels, with the leg pointed upward to providing a raised support frame for mounting vision systems or other sensors to expand the sensor's range for surveying the surroundings.

For upright balancing and roving (c) in the fore-aft direction, toe-balancing (e) and hopping (d), reaction-wheel stabilization may be used. The reaction wheels can be used as counterweights in the left-right direction (akin to a tight-rope walker's balance bar). Finally, the reaction wheels may act as counterweights for the stiff elastomer spring to work against in order to achieve the actual hopping motion of the vehicle in either conventional monopedal locomotion (f) or cartwheeling monopedal locomotion (g).

The mass of the wheels should be significant in order for the last three of these functions (e, f and g) to be viable. In the exemplary embodiment, the mass of each of the wheels is provided by the vehicle batteries 7, which are distributed symmetrically around the outer hub of each wheel, and the motors 45 (within their corresponding motor housings 9) that are used to drive the wheels 6, 8. By exploiting the weights of these relatively heavy components as opposed to adding dead weight to the wheels, the overall mass of the robot can be minimized.

Figure 5A:
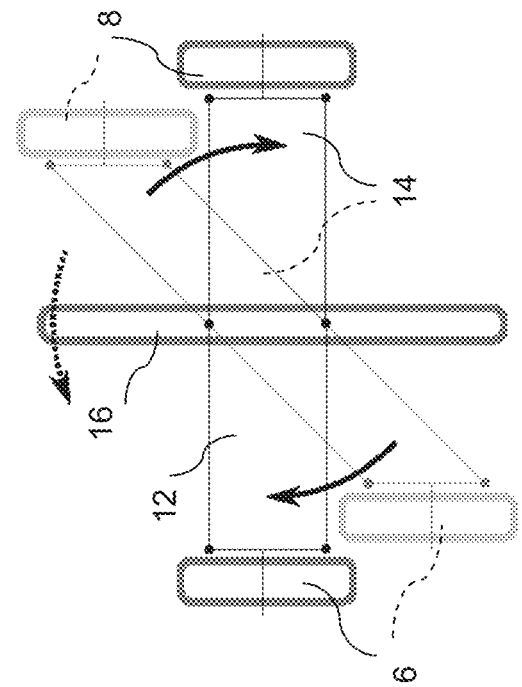
FIGS. 5a and 5b illustrate configuration of the arm assemblies during motion, where
Figure 5B:
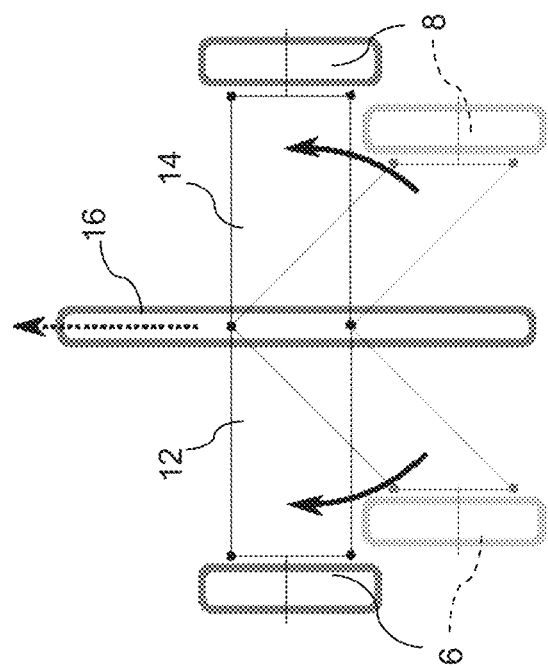
Figure 6:
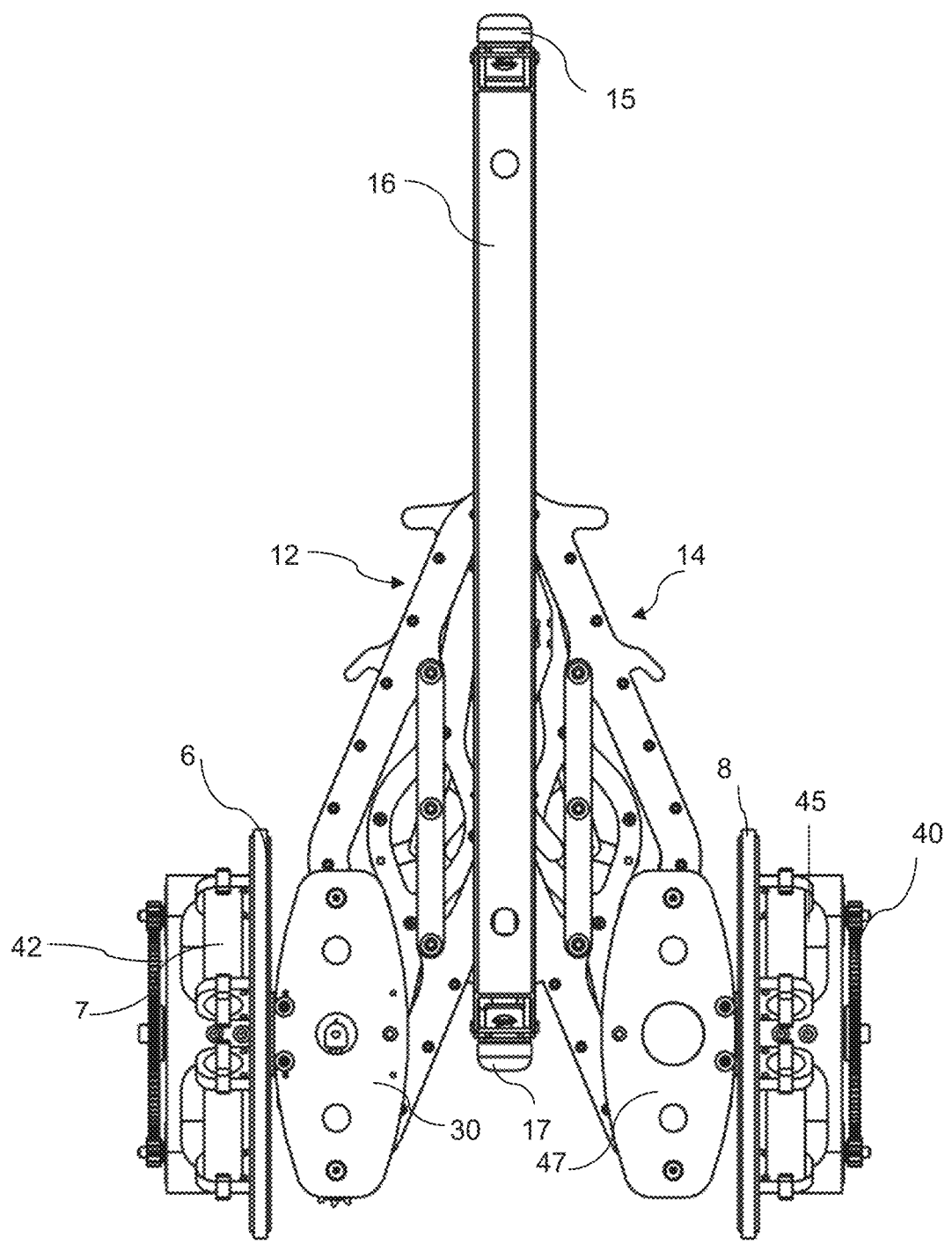
FIG. 6 is a diagrammatic front view of the multimodal hopping robot in an upright roving configuration.

The independently-actuated arms 12, 14 can function both as a hopping mechanism when rotated symmetrically about the central leg 16 (around the roll-axis) and as an actively-controlled roll-axis stabilizer when rotated anti-symmetrically about the central leg. A hopping motion, shown in FIG. 5a, is created by, starting from a configuration with the arms angled downward (indicated by grey lines in FIG. 5a), rapidly rotating the arms 12, 14 symmetrically upward relative to the leg 16, abruptly stopping as they reach a horizontal orientation. One or more level sensors (not shown), which may be located on the arm assemblies 12, 14 and/or on the leg 16, may be used to generate electrical signals that are communicated to the vehicle's controller (not shown). In an exemplary embodiment, the controller may be incorporated in one or more custom and/or commercial off the shelf (COTS) printed circuit boards (PCBs), such as the C200 MCU available from Texas Instruments. The PCBs will preferably be enclosed within a protective housing that can be attached to the leg 16 in a way that does not interfere with operation of the leadscrew. Feedback from the level sensors may be used to control the anti-symmetric arm motion for balancing. As illustrated by FIG. 5b, anti-symmetric arm motion generates an equal and opposite torque about the leg 16, enabling feedback stabilization about the roll-axis. Appropriate superposition of these two motions allows the robot to simultaneously stabilize and hop in the roll-axis plane. The majority of the vehicle's mass should be concentrated at the ends of the arms in order for the arms to effectively hop and balance the vehicle.

In the preferred embodiment, the leg 16 should be formed from a material that is light while maintaining sufficient stiffness to avoid buckling or introducing excessive structural flexibility. Lightweight steel, aluminum and titanium are examples of appropriate materials.

When out of ground contact, the wheels 6, 8 provide pitch-axis stability by actively applying torque, using the same principle as the anti-symmetric action of the arms. The arm assemblies 12, 14 are configured in a parallelogram linkage so as to maintain constant angular alignment of the wheels 6, 8 relative to the central leg 16 throughout the arm's range of motion. This simplifies the overall dynamics by preventing strong coupling between the pitch- and roll-axis dynamics. In this configuration, the top and bottom arms 18, 22 and 19, 23, respectively, preferably have an outward curvature at their lengthwise centers, as shown, in order to prevent interference between coplanar components. In other words, the ends of the arm sections curve inward relative to their midpoints. A simpler configuration in which the wheels are directly attached to a single link would function similarly for small angular deflections (+/−15 degrees) of the arms.

In the preferred embodiment, the left and right arm motors 28, 51 are high-speed/low-torque in order to optimize hopping performance. The arms are spring-loaded by extension springs 5, 52 to support the weight of the arms and to recover energy during hopping. While this spring mechanism should strongly resist motion of one arm relative to the other in order to support the weight of the wheels during hopping, it should not substantially resist rotation of either arm relative to the central leg 16. This arrangement allows the anti-symmetric rotation necessary for active roll-axis stabilization.

While placing a torsion spring across the arms fulfills these basic requirements, additional functionality can be realized via a more intricate linkage mechanism. Specifically, since each arm is actuated by torque applied at one of the outward joints by the corresponding high-speed/low-torque motor 28, 51, a digressive stiffness (decreasing with increasing deflection) is desirable in order to provide a more constant resistance to symmetric motion; i.e., provide high support at small deflections, without overwhelming the motors at large deflections. Secondly, in order to facilitate multimodal operation, the effective spring rate is preferably adjustable on-the-fly, without introducing torsional bias/asymmetry. Lastly, in order to store energy for large jumps (and to keep the vehicle in a folded configuration during roving), the arms should preferably self-lock into a fully-tensioned state without requiring additional actuators. Furthermore, the angular deflection at which locking occurs must be less than 90 degrees in order to prevent collision between coplanar mechanism links.

In the preferred embodiment, the self-locking feature is achieved by incorporating a pair of non-coplanar springs 5, 52 attached to spring levers 25, 53 within the parallelogram linkage. The relationship between the springs 5, 52 and levers 25, 53 is illustrated in FIG. 7, which shows how the top plane and bottom plane function separately and combined (right). The top plane, shown on the left in FIG. 7, includes right spring 5, left spring lever 25, and joint 34', which includes joint 34 and Watts linkage 70. The bottom plane, shown in the center of the figure, includes left spring 52, right spring lever 53, and the joint corresponding to left joint 34', which includes joint 55 and its associated Watts linkage (or other appropriate linkage.) The black dots in the line drawing correspond to the respective joints identified in FIGS. 1-3. FIG. 8 illustrates the kinematic equivalent realizations of the arm suspension mechanism shown in FIG. 7.

Figure 9:
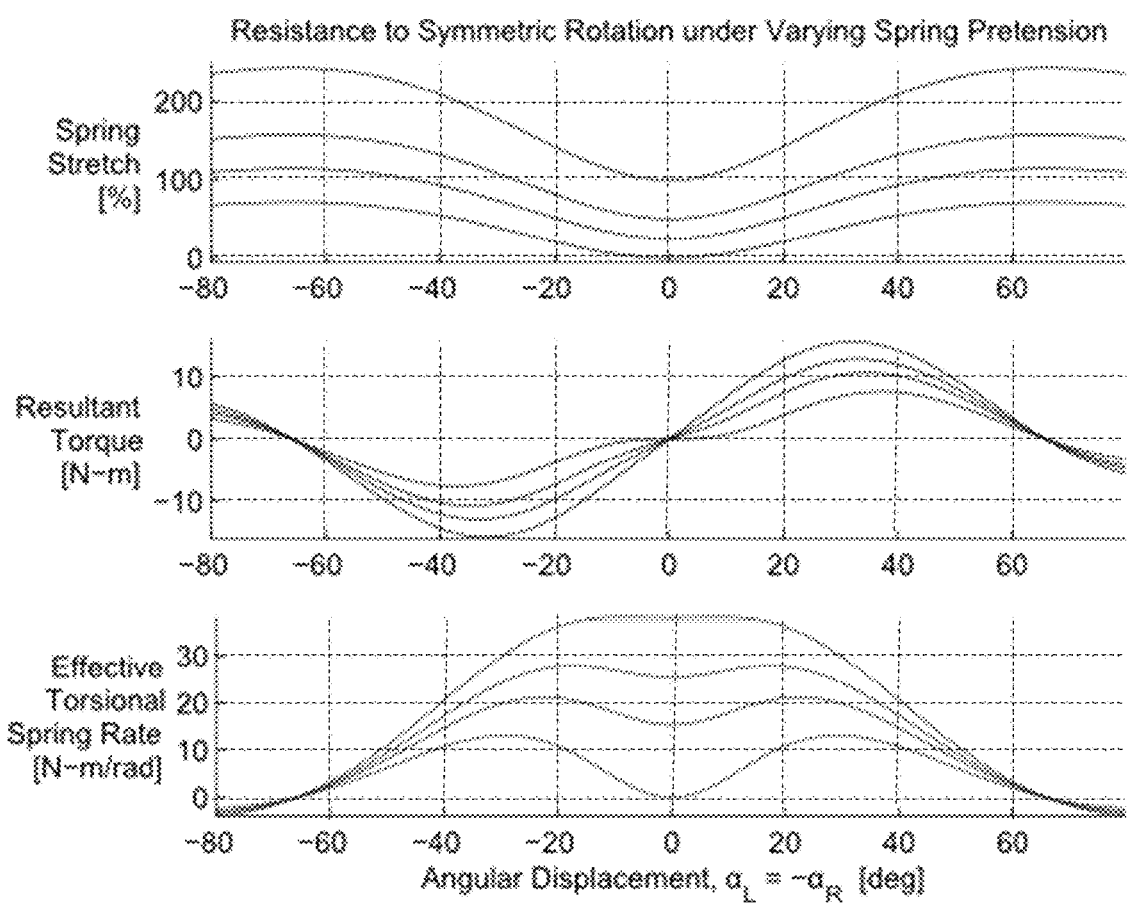
FIG. 9 is a series of plots of effective spring resistance due to symmetric rotation, showing angular displacement as a function of spring stretch, resultant torque and effective torsional spring rate.
Figure 10:
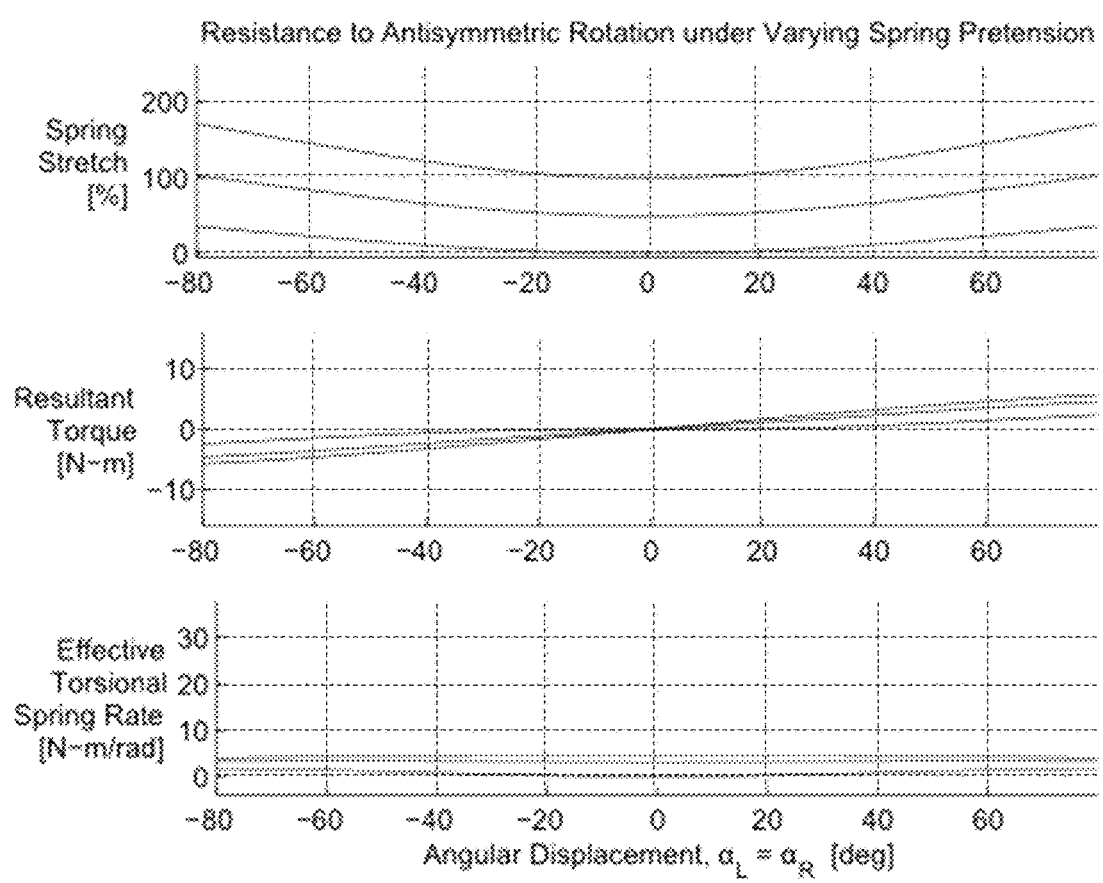
FIG. 10 is a series of plots of effective spring resistance due to antisymmetric rotation, showing angular displacement as a function of spring stretch, resultant torque and effective torsional spring rate.
Figure 11:
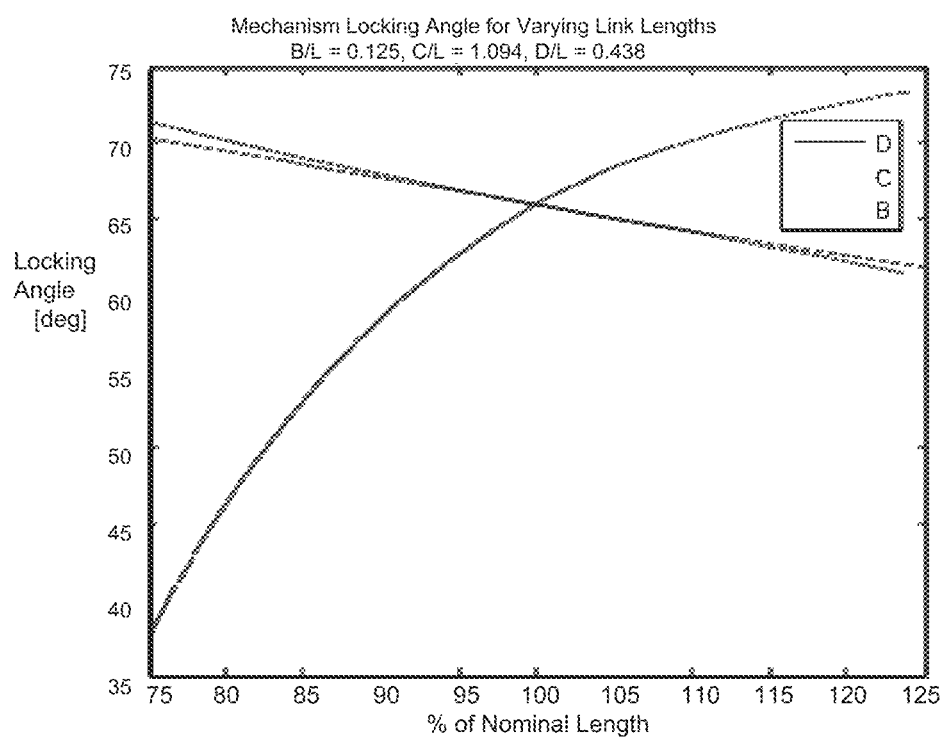
FIG. 11 is a plot of critical zero-torque arm angle (symmetric rotation) as a function of linkage parameters.

As illustrated by the curves plotted in FIG. 9, the resistance to symmetric motion decreases with increasing deflection from horizontal, (arms outstretched, as in FIG. 1), measured as angular displacement ($\alpha_L = -\alpha_R$ [deg]), and eventually changes sign past a certain critical angle ("0" in the plots). This causes the arms to lock into a fully tensioned state, provided that the arms are constrained to deflect at most slightly past this critical zero-torque angle. In FIG. 9, angular displacement is plotted relative to percentage spring stretch, resultant torque (in Newton meter), and effective torsional spring rate (in Newton meter/radian), respectively, at four different levels of spring pre-tension. FIG. 10 illustrates the resistance to anti-symmetric rotation under varying levels of spring pre-tension using the same comparisons used in FIG. 9. FIG. 11 is a plot of the critical zero-torque arm (locking) angle as a function of varying link lengths for symmetric rotation, where B/L=0.125, C/L=1.094, and D/L=0.438.

Figure 12:
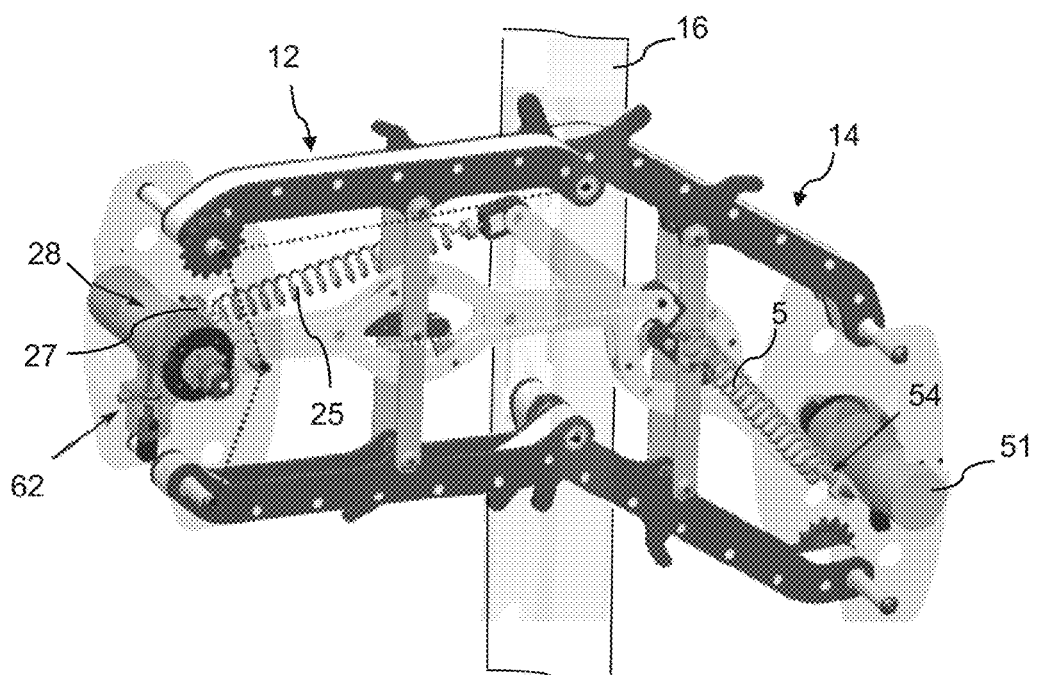
FIG. 12 is a perspective view of the arm mechanism of the first robot embodiment during conventional operation.

Note that the symmetric configuration enables bi-directional series-elastic actuation using the extension spring. Referring to FIG. 12, during conventional operation, the main body of left arm motor 28 is held stationary by a small actuated clamp 62. Loosening clamp 62 allows the motor 28 body to rotate. This, in turn, drives left spring pre-tension pulley 27 around which the one end of extension spring 25 is wound. Similarly, right arm motor 51 may be rotated by loosening its corresponding clamp (not visible in the figures) to drive right pre-tension pulley 54 to adjust the tension on spring 5. These features allow the springs to be pre-tensioned while the arms 12, 14 are locked at the maximum extent of travel by loosening the clamps 62, and driving the motors 28, 51 in the direction that causes downward arm motion (in order to prevent unlocking). Note that, since the springs 5, 25 are always in tension, they may be tightened by driving the corresponding pulley 27, 54 in either direction. Additionally, the motors 28, 51 may actuate in series with the springs 5, 25 by loosening the clamps. This is sometimes referred to a "series elastic actuation" and may be useful for buffering mechanical energy, and isolating the motors 28, 51 from mechanical shock.

As described above, each drive wheel 6, 8 has two wheel motors that propel and steer (via differential drive) the vehicle when in contact with the support surface. Referring to FIGS. 1 and 2, on right drive wheel 8, two wheel motors 45 are fixed on the wheel hub via housing 9. The drive gears of motors 45 engage spur gear 40, which is mounted on axle 46. As previously mentioned, the batteries 7 are located on each wheel hub to provide the added weight needed for balancing, hopping and monopedal motion. On the left side, drive wheel 6 has two motors 45 that drive spur gear 42 to rotate the wheel around its corresponding axis.

In an alternative embodiment, the drive wheels may be replaced by a second set of arms mounted in an orthogonal arrangement with the arm assemblies 12, 14. This provides a pitch-axis arm pair and a roll-axis arm pair. In this embodiment, level sensors may be provided within both the pitch- and roll-axes to provide the feedback needed to control anti-symmetric arm motion within both axes. The resulting structure can provide highly stable monopedal locomotion that can balance in multiple axes. Since the weights of the wheels and their corresponding drive motors are eliminated in this embodiment, additional weight may need to be added to the end of each arm assembly to provide the mass needed for hopping and toe balancing.

The multimodal robot of the first embodiment can be fitted with optical, audio, thermal, chemical and other environmental sensors, or a combination of different sensors, which can be used to provide input into an adaptive system controller, e.g., artificial intelligence to allow the vehicle to develop a situational awareness that will permit predictive path planning in complex environments. Alternatively, or in addition, the vehicle can have incorporated into its electronics a transceiver for receiving remote commands and for transmitting information collected by its sensors.

The robotic system described herein is useful for maneuvering within complex structures or rugged terrain via different combinations of hopping, pole climbing, toe balancing, horizontal roving and uprighting, all in a controlled fashion. For example, the robotic system can climb stairs using a combination of pole climbing and toe balancing to climb stairs.

Second Multimodal Robot Embodiment

Figure 14A:
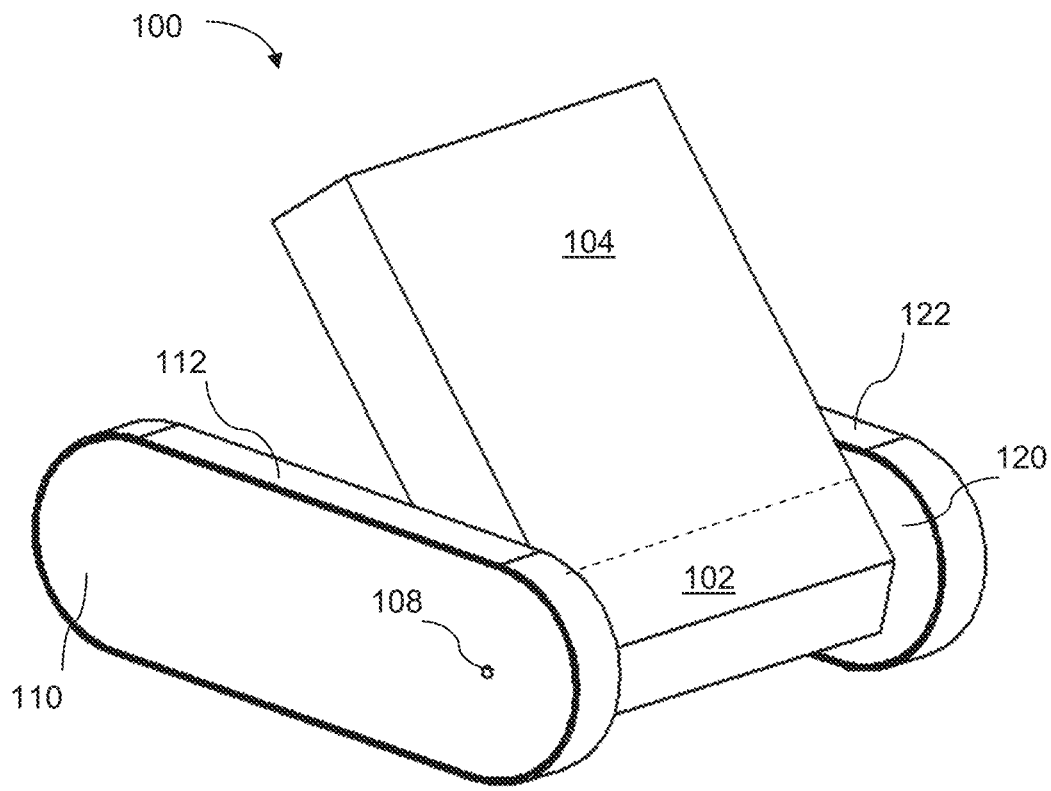
FIG. 14a is a diagrammatic perspective view of a multimodal robot according to a second embodiment.

A second multimodal robot 100, illustrated in FIGS. 14, 15 and 20, is a treaded vehicle that can perform stable both heel and toe standing, i.e., "wheelies" and "stoppies", and can balance on the edge of a step or similar change in elevation. As shown in FIG. 14a, multimodal robot 100 includes a pair of arms 110 and 120 which comprise independent tread assemblies that are attached to chassis 102 by way of tread shaft 108. In the exemplary embodiment, a single chassis holds the actuators, sensors, electronics, and batteries required for operation and communication with the robot. Rotation of the shaft 108 causes the tread links to advance for translational movement; rotation about the shaft causes the entire tread assembly to rotate with respect to the chassis. This unique "hip joint" is described in more detail below. An optional platform 104 may be attached to chassis 102 to provide a support for attaching sensors, cameras, or other equipment or instruments to be transported on the robot. Where no platform is provided, a housing may be provided to enclose the chassis and any associated electronics, batteries or actuators. If a platform 104 is included, the chassis housing and platform can be the same structure (as illustrated, chassis 102 is separated from platform by a dashed line), or the chassis housing can be fully or partially enclosed within the platform. It should be noted that platform 104 is not limited to a rigid structure—it may be a rigid or a deformable body which may be passively or actively deformed to adapt the robot as required for a particular task. Further, the platform need not be a solid, enclosed structure, but can be an open frame or a combination of open and closed portions.

Figure 14B:
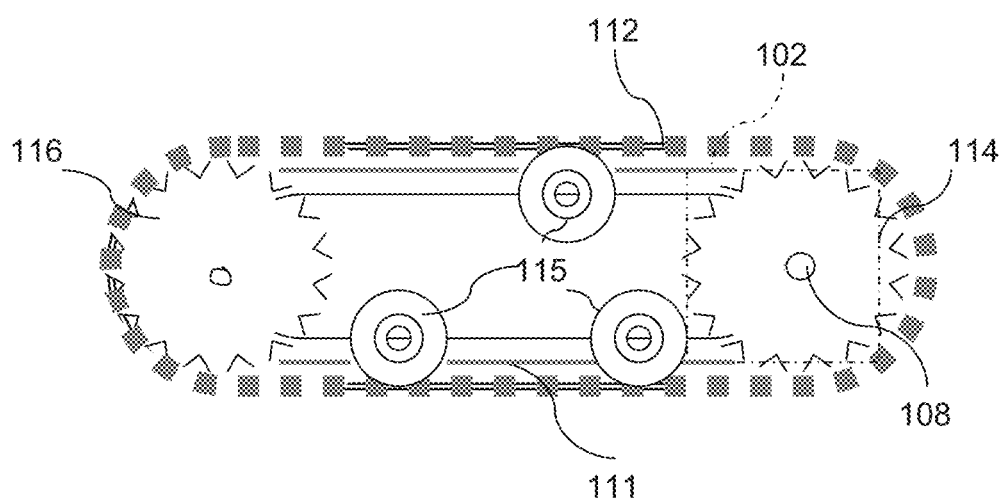
FIG. 14b is a diagrammatic side view of an exemplary tread assembly.

One or more sprockets may be driven with an actuator such as a motor, engine, or pneumatic or hydraulic turbine. As illustrated in FIG. 14b, which is a simple diagram showing the components of a tread assembly with a side cover removed, each tread assembly includes two or more tread sprockets 114, 116 rotatably mounted in the same plane on a vertical side plate or frame 111 to engage tread 112. One or more tread guides 115 may also be rotatably mounted on frame 111. Tread sprocket 114 is mounted coaxially with shaft 108. One or both sprockets 114 may be mounted with a sensor to measure position, speed, and/or torque. A force or pressure sensor may optionally be provided underneath a span of the tread 112 to detect where the tread assembly is in contact with the ground or other surface. Mechanisms as are known in the art for adjusting the tension of the tread may also be included. Control electronics, batteries, and communications electronics may be mounted within the tread arm 110, or may be housed within chassis 102 or platform 104, if appropriate.

Figure 20A:
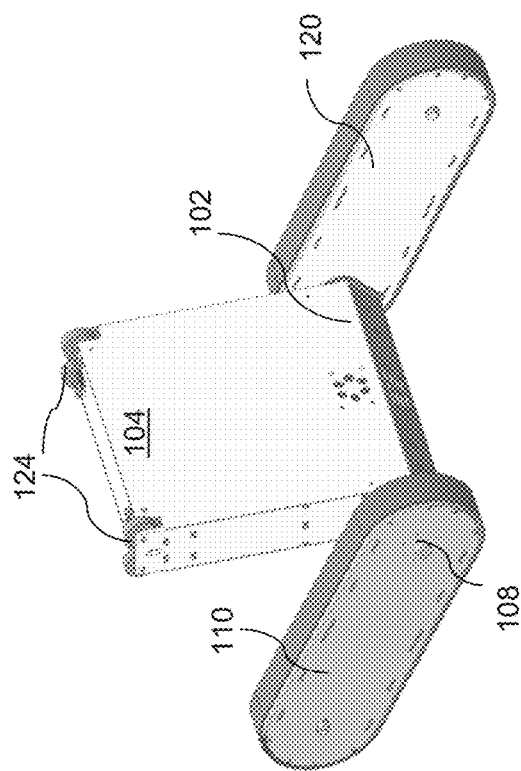
FIGS. 20a-20d are perspective views of the treaded robot, where
Figure 20B:
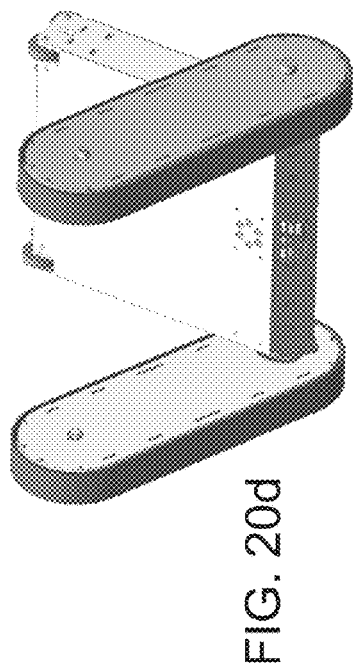
Figure 20C:
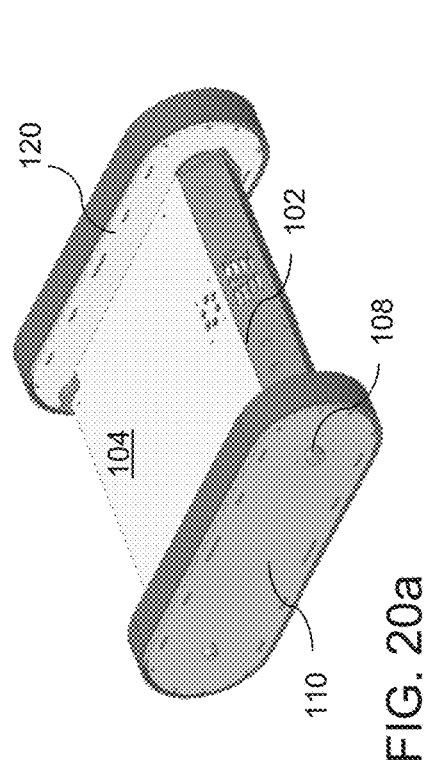

Referring briefly to FIGS. 20b and 20c, wheels 124 may be rotatably mounted near the edge of platform 104, opposite the chassis, to further expand the robot's functionality. For example, in FIG. 21a, the robot is shown maneuvering within a duct 128 or other narrow passageway by effectively wedging itself between opposite sides of the duct. The wheels 124 allow the robot to apply pressure perpendicular to the side of the duct as the robot moves forward along the length of the duct. Sensors within the treads or attached to the tread shaft are preferably included to provide feedback to allow the robot's controller to adjust the relative angles of the chassis and treads to maintain the pressure needed to allow the robot to progress through the duct or passageway. The wheels 124 may be attached to freely rotate around their axles, or they may be attached to the drive shaft of one or more additional motors for providing an additional degree of control.

A variation on the embodiment of FIG. 14a is illustrated in FIG. 17, where the tread assemblies are replaced with a corresponding wheel assembly, which includes two or more wheels 117, 118 rotatably mounted in a planar relationship on the arms 119. In this embodiment, a drive chain or other linkage should be provided to drive wheels 117 and 118 together in order to perform toe balancing or other maneuvers that require force to be applied at the distal or toe end of the arm 119. Axle 108 extends from chassis 102 as above to drive wheels 118. The following descriptions of the robot's "hip joint" and maneuvers enabled thereby are equally applicable to the treaded version of FIG. 14a and the wheeled configuration of FIG. 17.

Figure 19:
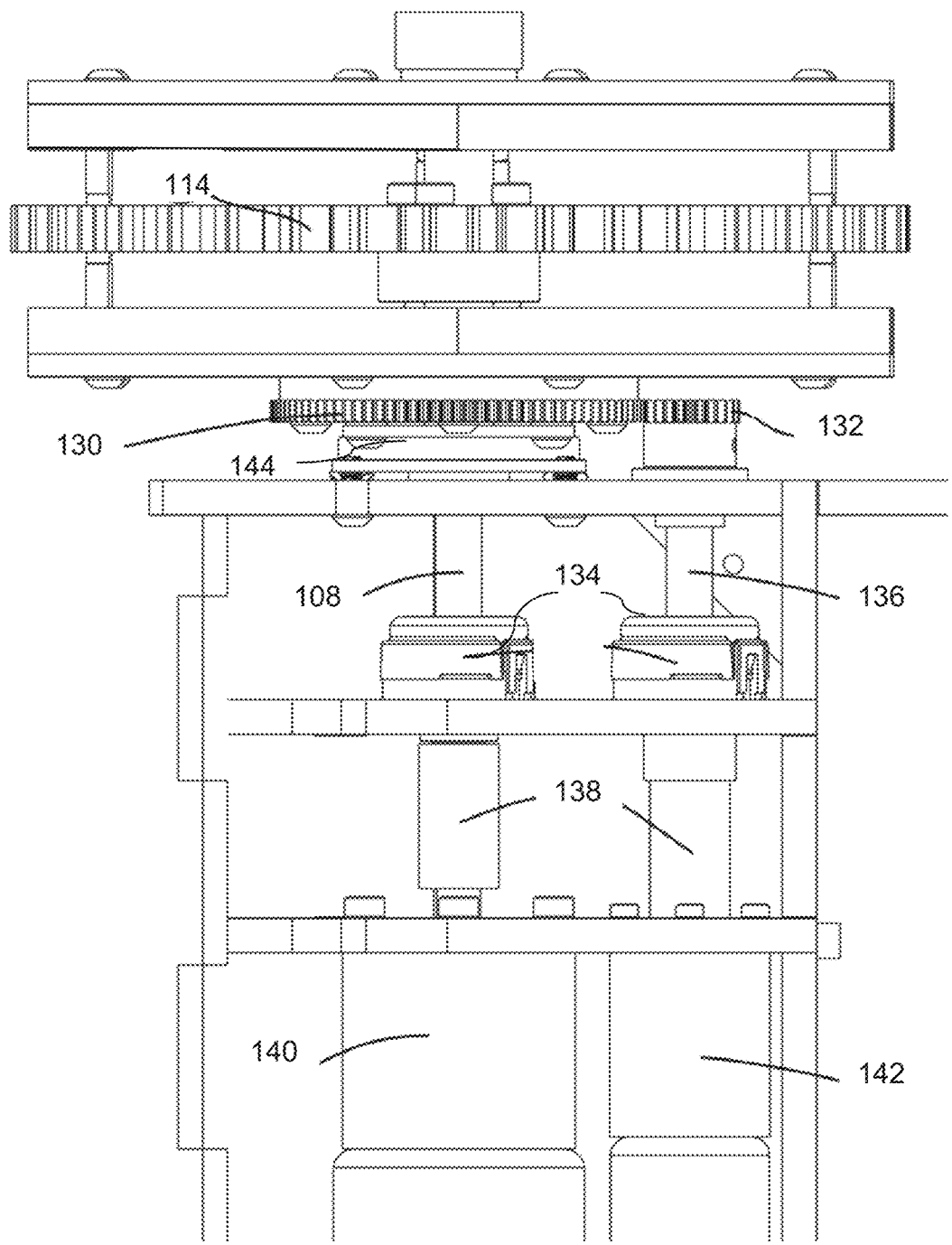
FIG. 19 is a diagrammatic view of the components of a hip joint of the second multimodal robot embodiment.

Referring to FIG. 19, in the preferred embodiment, a two degree of freedom joint is used in the mobile robot of FIG. 14a to connect each arm 110, 120 (or 119 in the wheeled version), to the chassis 102 and transmits two decoupled, yet coaxial, torques. The torque to advance the treads 112, 122 (or rotate the wheels) is transmitted by coupling the tread shaft 108 on one end (via coupling 138) to a motor 140 and on the other to the drive sprocket 114 (or wheel). This shaft passes through, and spins freely relative to, a tread gear 130, which is rigidly mounted to the arms 110, 120 (or 119). A pinion gear 132 mounted to a second shaft 136, parallel to the tread shaft 108, causes the pinion gear 132, and arms 110, 120 (or 119), to rotate with respect to the chassis 102 when driven (via coupling 138) by the second motor 142, which may also be referred to as the boom motor. This assembly provides for the adjustment of the center of gravity, as will be discussed in more detail below. A slip ring 144 (with one or more channels) may be located coaxially with the first shaft 108 in order to transmit and receive power and/or electrical signals between the chassis 102 and arms 110, 120 (or 119) throughout a continuous range of rotation. Optical encoders 134 may be included to measure the angle of the chassis with respect to arms 110, 120 (or 119) to provide feedback to the control system. In an alternative configuration, the components of the hip joint, i.e., all motors, gears and sensors, may be located in the arms, such that the chassis can simply be an axle that joins the shafts 108 of two arms 110, 120 or 119 together.

Figures 15A, 15B, 15C:
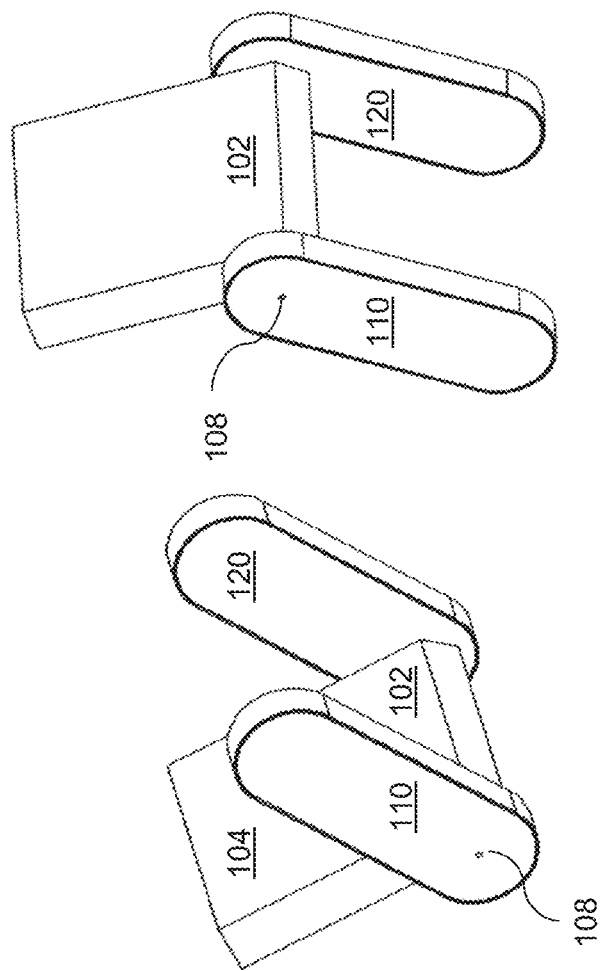
FIGS. 15a-15c illustrate different modes of locomotion of the embodiment of FIG. 14, where
Figure 20D:
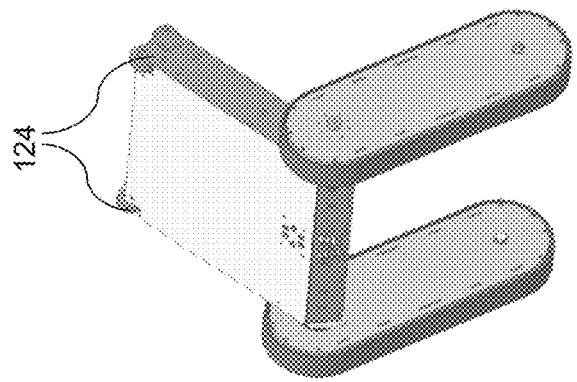

The embodiments of FIG. 14 and FIG. 17 are capable of independently rotating the arms 110, 120 (or 119) with respect to the chassis 102 in addition to driving the treads 112, 122 (or wheels 118). This allows the robot to dynamically adjust its center of gravity. Commercially-available MEMS accelerometers and gyroscopes, coupled with advanced filtering techniques, allow the robot to estimate its angle with respect to gravity. With the arms 110, 120 unfolded away from the body, the inventive multimodal robot can balance upright on the distal (with respect to the tread shaft 108) end of the arms, as illustrated in FIGS. 15b and 20c, making it possible to significantly expand the range of an on-board sensor or instrument, such as a camera. An exemplary robot with tread assemblies on the order of 10-15 cm high and 30-50 cm long may be able to stand up to 65 cm tall and overcome obstacles that would otherwise be insurmountable with a 10-15 cm tall treaded robot. The inventive design is also capable of both crossing chasms nearly as wide as the vehicle by extending the arms in opposite directions, as illustrated in FIGS. 15c and 20b. Further, the front-mounted pivot of the chassis may be used to actively dampen vibrations when driving quickly over rough terrain. The reconfigurability of the arms permits several modes of locomotion, which the inventive robot can switch between based on the type of terrain encountered. As illustrated in FIG. 15a and FIG. 20d, the robot can balance on the proximal (with respect to the tread shaft 108) end of the arms, i.e., perform a wheelie, with the proximal end of the arms 110, 120 in contact with the ground and neither the chassis 102 nor the distal end of the arms in contact with the ground. This can be referred to as the "V-mode". The angle between the chassis 102 and the arms 110, 120 may be changed by actuating the boom motor where the tread motor will be actuated as needed to keep the changing center of gravity over the contact point to keep the robot from falling over. This change in angle may be the result of a reference command sent by an operator or performed automatically by the robot in response to an external stimulus or as part of a programmed sequence. This maneuver can be used to initiate a climbing sequence, for example. In FIGS. 15b and 20c, the robot is illustrated in a toe balance, or a "stoppie", which is performed by placing the distal end of the arms 110, 120 in contact with the ground and neither the chassis 102 nor the proximal ends of the arms in contact with the ground. This can be referred to as the "C-balancing mode." The angle between the chassis 102 and the arms 110, 120 may be changed by actuating the boom motor where the tread motor will be actuated as needed to keep the changing center of gravity over the contact point. This change in angle may be the result of a reference command sent by an operator or performed automatically by the robot in response to an external stimulus or as part of a programmed sequence. The multiple modes of locomotion according to the inventive mechanical design coupled with feedback control algorithms will enable the robot to overcome complex terrain, such as stairs, rubble, and other obstacles while retaining a small form factor to navigate in confined spaces and to reduce cost and weight. In a preferred embodiment, the on-board electronics includes wireless communication circuitry, as is known in the art, to enable bidirectional communication over WiFi. In an especially preferred embodiment, the robot includes appropriate electronics and programming to enable the robot to communicate with one or more computers, other robots, and mobile devices, such as a cellular telephone by using, for instance, the IEEE 802.11g standard.

Figure 21A:
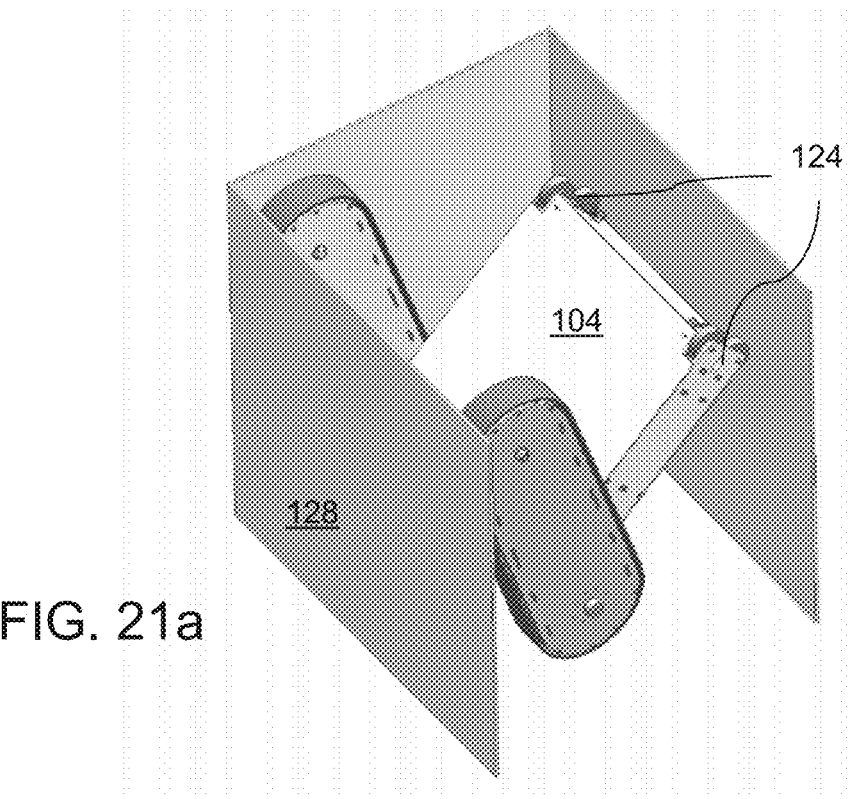
FIGS. 21a and 21b illustrate examples of functions performed by the multimodal robot of FIG. 14, where
Figure 21B:
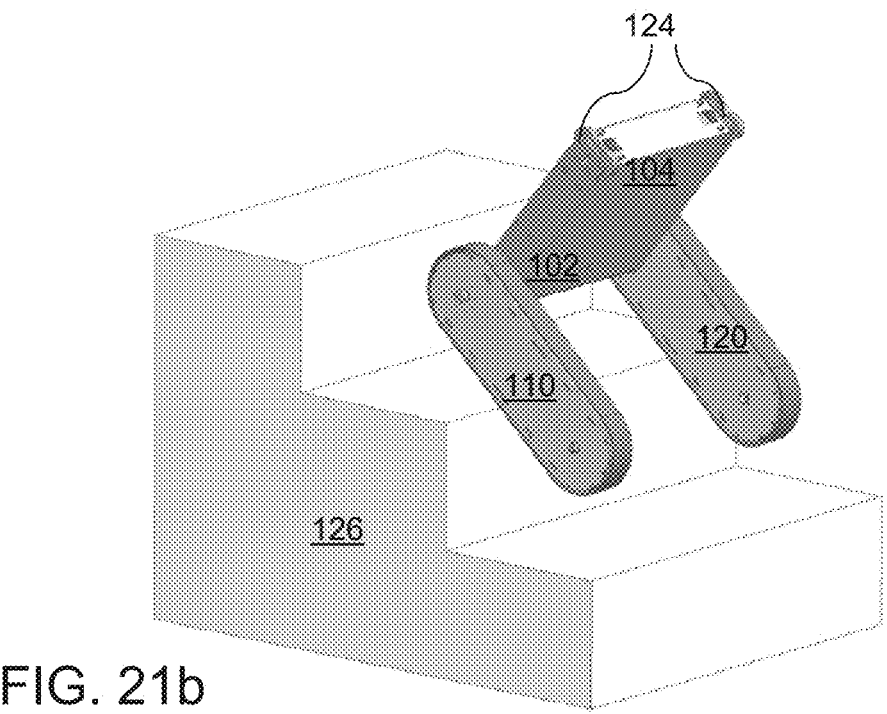

Examples of complex tasks that can be performed by the treaded/wheeled robot are illustrated in FIG. 21a, which was discussed above, and FIG. 21b, which illustrates a portion of a stair climbing maneuver as well as showing how the treaded robot is capable of "perching" on small surfaces, such as the edge of a stair (126), a branch, or a telephone or power line. In this configuration, the treads of the robot are in contact with the surface at one point and the robot maintains its balance by adjusting the chassis and/or boom to keep its center of gravity in line with the contact point. Inertial sensors (e.g., accelerometers and gyroscopes) may be used in conjunction with contact sensors (e.g., force sensitive resistors) inside the tread assemblies to determine the contact point. Active balancing provided by the combination of the tread and balancing motors and continuous feedback from the sensors to control the motors maintains the robot's center of gravity to stabilize it sufficiently to hold its position. The center of gravity is shifted in the desired direction when the robot is made to climb up or climb down the stairs 126 so that the center of gravity is kept directly above the contact point using a combination of modes of movement.

FIGS. 22a and 22b illustrate one example of operations that may be performed by the above-described multimodal robot for climbing an obstacle such as a staircase. In step 160, the robot approaches the step while balancing on the distal end of the arms (in "C-balancing" mode, as illustrated in FIGS. 15b and 20c). In steps 162 and 164, upon arriving at the step, the position of the chassis is adjusted such that the center of mass is directly above the edge of the first step. In steps 166 through 174, via a coordinated combination of tread actuation and appropriate variation of the angle between the treads and the chassis, the robot balances on the edge of the step while gradually edging up the step.

In one realization of this maneuver, the angle between the treads and the chassis is actuated as a function of time based on what is required, nominally, to keep the center of mass over the edge of the step while maintaining the desired angle between the chassis and horizontal, while the contact point between the treads and the edge of the step moves (relatively slowly) along the arm; balancing is then achieved via feedback control applied (relatively quickly) via tread actuation. In a second realization of this maneuver, feedback control is applied via a coordinated application of both tread actuation and small adjustments to the angle between the treads and the chassis.

Upon reaching the top of the step, there are two possible scenarios: The first is that vehicle has either reached the top of the stairs, or the angle of the edges of successive steps from horizontal is less than the angle of the chassis from horizontal (that is, the angle of the steps is relatively shallow). In either situation, the vehicle simply returns to C-balancing mode upon reaching the top of the step and continues its forward movement. If it reaches another step, the situation is equivalent to that depicted in step (1).

The second scenario is that the vehicle has not reached the top of the stairs, nor is the angle of the edges of successive steps from horizontal relatively shallow. In this case, the angle of the chassis from horizontal as the vehicle nears the top of the current step may be planned to be nearly the same as the angle of the edges of successive steps from horizontal. By planning the maneuver in this manner, the proximal end of the vehicle will reach the edge of the next step while still in contact with the edge of the previous step, as in step (8). The center of mass may then be adjusted to be over the edge of the next steps (9) and (10), and the process described in steps (4) through (7) is repeated, as illustrated in steps (11) through (15).

Various combinations of the above steps can be used to maneuver the robot into positions for performing a desired task. The inventive robot is able to perform this and similar tasks because it operates, or can be operated, to shift its center of gravity to balance on a small point by changing the angle between the arms and the chassis, and by using the treads or wheels to "catch itself" before it falls.

The multi-modal robot of the second embodiment is capable of performing a wide variety of maneuvers with the minimal set of actuators, thus saving cost and weight. Additional sensors can be mounted internally or externally, such as contaminant sensors, Global Positioning System (GPS) receivers, wind sensors, analog or digital cameras, optical or radiation sensors, among many other possible uses. End effectors may be mounted on the mobile robot platform 104 or arms 110, 120 or 119, such as linkage mechanisms with a gripper, solid or liquid collection systems, lighting systems, or weapons systems, among many others.

An alternative configuration of the second multimodal robot embodiment is illustrated in FIGS. 16a-c. In this configuration, shifting of the center of gravity is still used, however the manner in which the shifting is effected is different.

In this embodiment, the robot includes a chassis 148 and an actuated boom 150. The chassis 148 is driven by a pair of treads 152, 154 (or conventional wheels 156 may be substituted, as shown in FIG. 18). The boom 150 has significant mass. In the exemplary embodiment, the mass of the boom is approximately equal to the mass of the chassis. As in the previous embodiment, motors are configured on the robot to drive the treads (or wheels) and to change the angle of the boom 150 with respect to the chassis 148.

The hip joint described above with reference to FIG. 19 may also be incorporated in the configuration that uses a boom for shifting the center of gravity. In this case, the boom motor (which corresponds to the balancing motor) will activate rotation of the boom arm.

The second multimodal robot embodiment includes sensors to detect the robot's configuration. Feedback control is applied to enable the vehicle to balance on its front or rear cogs (or wheels). The vehicle can also climb obstacles (including stairs) by extending the mass of the boom 150 over the obstacle and rotating the chassis up and over. This maneuver may be done in a statically stable manner or in a dynamically balanced manner. The boom arm may be extensible and/or may itself be configured with wheels or treads, in a manner similar to the wheels 126 in the previous configuration.

As in the first multimodal robot embodiment, the configuration with the boom 150 takes advantage of the weight of the batteries for use as a functional mass. An electrical connection is made between the boom and the chassis to transmit the power from the batteries to the motors housed within the chassis. In the exemplary embodiment, this connection is made with slip rings, steel shafts riding in bronze bushings, as in the hip joint describe above. The slip rings allow the boom to be rotated about the chassis with no angular limitation.

In this configuration, the treads of the robot are in contact with the surface at one point and the robot maintains its balance by adjusting the boom to keep its center of gravity in line with the contact point. Inertial sensors (e.g. accelerometers and gyroscopes) may be used in conjunction with contact sensors (e.g. force sensitive resistors) inside the tread assemblies to determine the contact point.

The second multimodal robot embodiment uses multiple commercial off-the-shelf (COTS) sensors (MEMS-based accelerometers and gyroscopes, and optical encoders 134 (shown in FIG. 19) to estimate the angle of the chassis with respect to gravity (in the configuration of FIG. 14) and the angle of the boom arm with respect to the chassis (in the configuration of FIG. 16). The programming of the robot includes a control system (which may include a Kalman filter) to actuate the motors to dynamically balance the robot. The current prototype also accepts manual input via a COTS radio frequency remote.

In one application of the second multimodal robot embodiment, an "army" of the robots was deployed in an open, paved area (a parking lot) around which plumes of colored smoke were released. Each robot was equipped with a sensor pack and electronics to measure smoke concentrations and wind velocities. The measurements were transmitted in real time (via WiFi and 3G cellular data links) to an off-site supercomputer running advanced weather-forecasting type algorithms. These algorithms, in turn, synchronized a numerical simulation of the smoke plume with the actual measurements taken in the field in real time (a problem known as data assimilation), then told the vehicles where to move next in order to minimize the uncertainty of the forecast. The goal of the system, which was successfully realized in the experiment, was to forecast where the smoke was going to go, as precisely as possible, before it got there, while coordinating the vehicles in real time to collect the most valuable information possible for the particular wind conditions present during that test. The research has important social relevance related to new technology and algorithms for tracking a wide variety of environmental plumes of interest, from gulf-coast oil, to Icelandic volcanic ash, to possible chemical/radioactive/biological plumes in homeland security settings.

Third Multimodal Robot Embodiment

In a third embodiment, a spherical robot incorporates momentum exchange devices to achieve rapid acceleration or deceleration in any direction.

Figure 23:
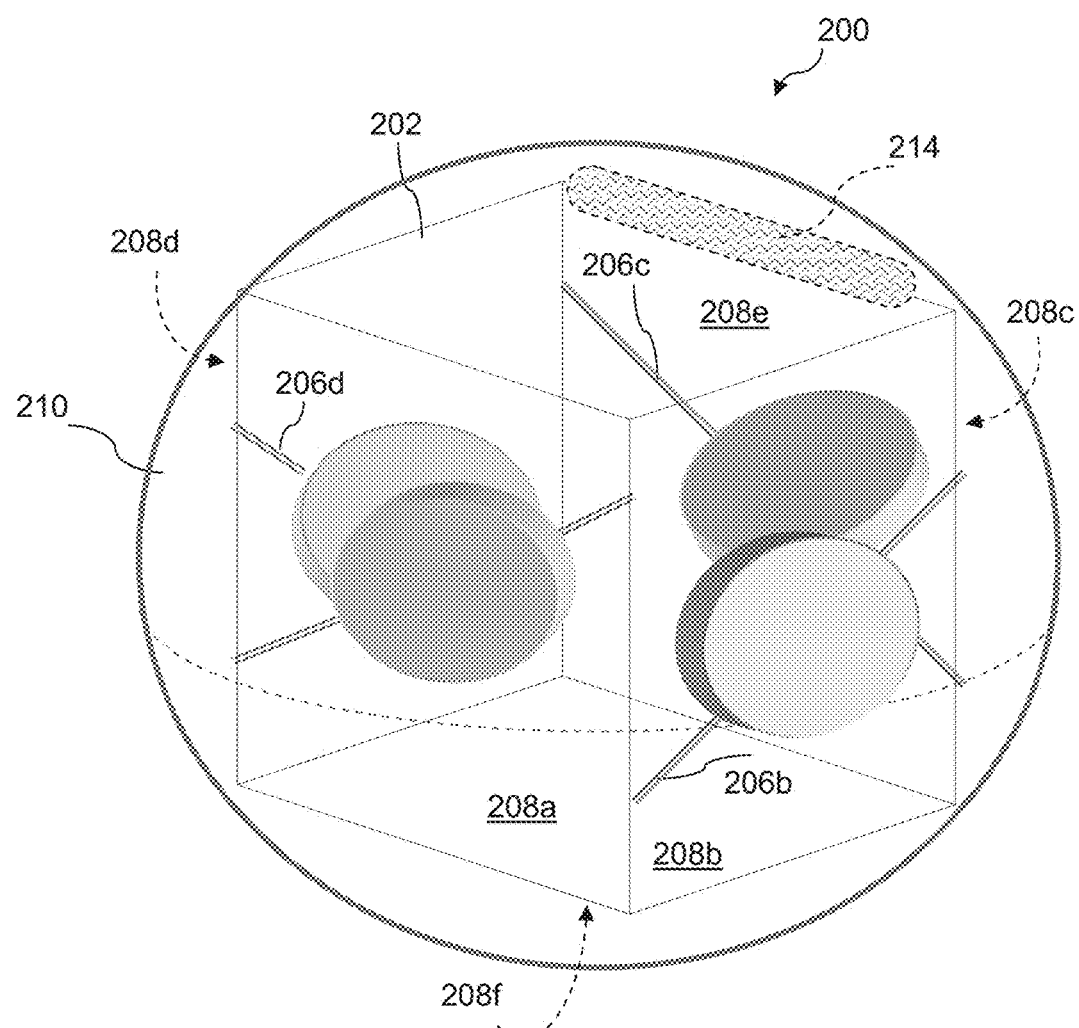
FIG. 23 is a diagrammatic perspective view of a spherical robot according to the third multimodal robot embodiment.

As illustrated in FIG. 23, an exemplary embodiment of the spherical robot according to the present invention includes a frame 202 for supporting a plurality of momentum-exchange elements 204 so that the elements are distributed relative to the surface of a spherical shell 210 that encloses the frame 202, elements 204, and all control electronics, actuators and batteries that are required to power and control the robot. Sensors may also be included to provide feedback to optimize balancing and locomotion under different conditions. The control electronics may include wireless communication devices for communication with a remote computer, mobile phone or other wireless device. Alternatively, the spherical robot may be tethered to a controller, such as a joystick, track ball or the similar external control device.

Figure 24A:
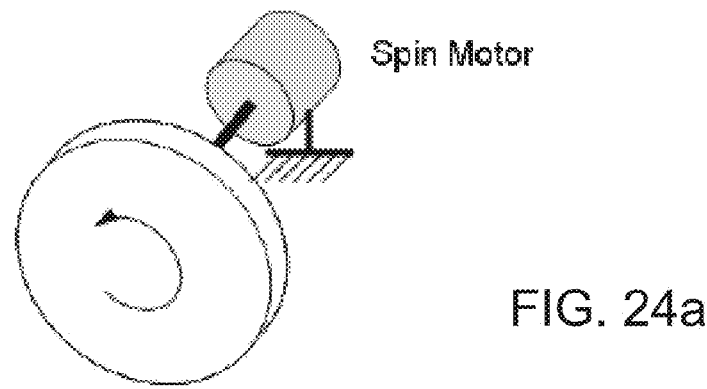
FIGS. 24a-24c are diagrammatic views of three different prior art momentum exchange devices that may be used in the spherical robot, where
Figure 24B:
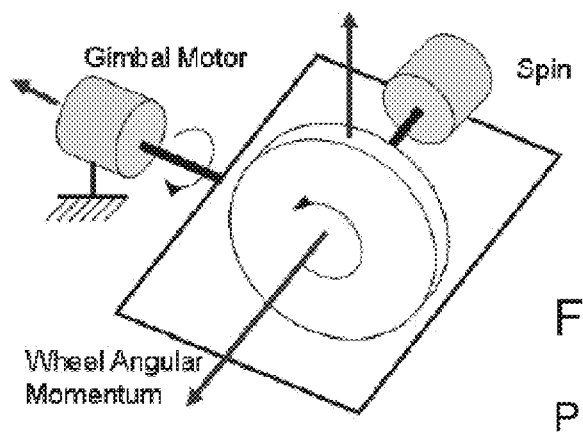
Figure 24C:
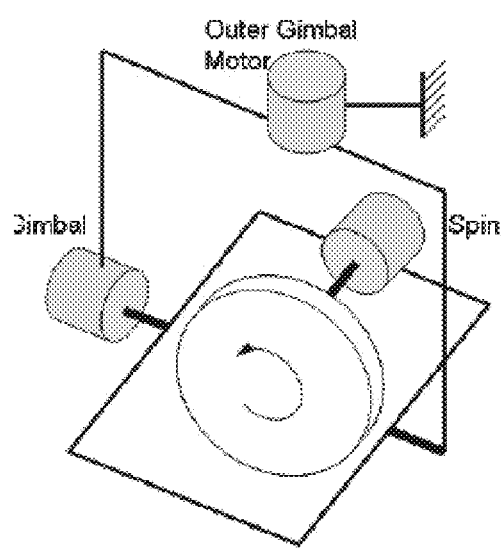

The basic elements of three different momentum exchange elements that may be used in the spherical robot are shown in FIG. 24a-24c. The reaction wheel assembly (RWA) shown in FIG. 24a includes a single motor for spinning the wheel. A single gimbal control moment gyro (SGCMG) is shown in FIG. 24b. This assembly includes two motors, one for spinning the wheel, the other for rotation of the gimbal, allowing the direction of the wheel angular momentum to be varied. In FIG. 24c, a double gimbal control moment gyro (DGCMG) is shown, with three motors, including the two used in the SGCMG plus a third motor to vary the plane on which the SCGMG sits.

Figure 25:
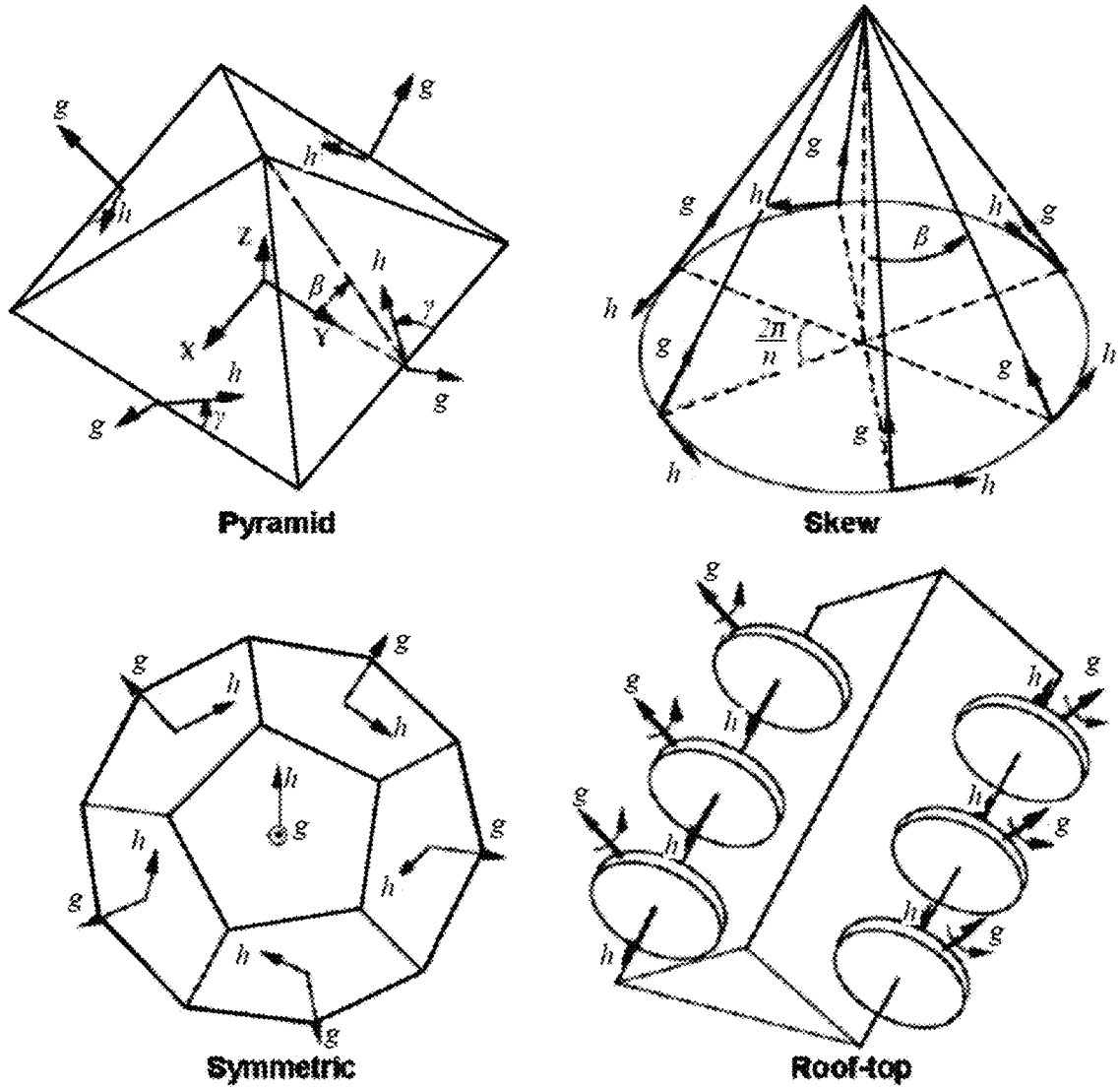
FIG. 25 is shows four exemplary geometric configurations for a frame for supporting the momentum exchange elements.
Figure 26:
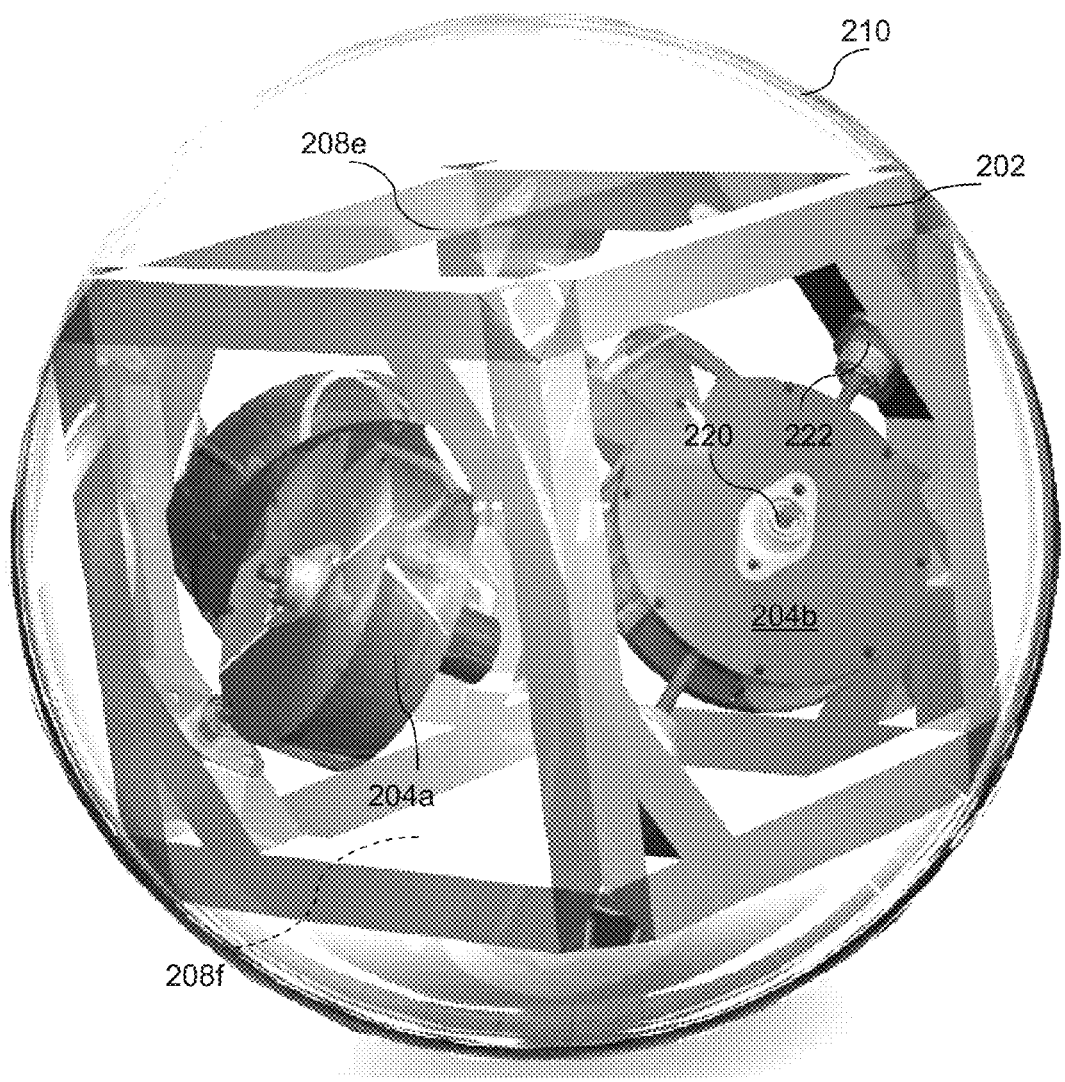
FIG. 26 is a three-dimensional computer drawing of a first exemplary construction of the spherical robot.

In the configuration of the fourth embodiment that is shown in FIGS. 23 and 26, a cubical frame 202 is populated with four single-gimbal CMGs 204a-204d, with each gimbal axis 206a-206d at an angle extending across each of four faces 208a-208d. This makes the inventive robot particularly agile, as the momentum needed to maneuver is stored within the SGCMGs and, thus, does not need to be generated by high-torque, large electrical power-consuming motors as in standard direct drive systems of the prior art. The SGCMGs may be operated individually or simultaneously to effect the desired function, such as rolling, steering, stationary rotation around the contact point or balancing in position. While frame 202 is shown in a cubical configuration, it may be constructed with virtually any geometric shape that fits within a spherical shell, including pyramidal, conical, symmetric, skewed, linear arrangements combined with 3-D structures, and various other combinations of such shapes. FIG. 25 illustrates a few of a large variety of possible arrangements of momentum exchange elements, including a pyramid, skewed cone, symmetrical octahedron, and roof-type with linear combinations of elements. Virtually any geometrical shape can be used that will allow momentum to be generated in a plurality of different directions for steering, rolling, balancing, etc. Further, the robot is not limited to spheres as an outer structure, but may include generalized amorphous ellipsoidal configurations as well.

The shell 210 that is used to enclose the frame, momentum exchange elements, the actuators and control electronics may be formed from a wide range of materials, selection of which will depend on the intended application and will be within the level of skill in the art. In general, the outer surface of the shell should be capable of generating sufficient friction with the surface on which the robot will be moving to efficiently convert the action of the momentum exchange elements into motion in the desired direction. The material may be a rigid, preferably impact-resistant plastic or polymer, which may include carbon-fiber or fiberglass, among others. In some applications in harsh environments, metals, metal-composites, or specialized materials such as KEVLAR® composites, may be appropriate for particularly hazardous applications. In other applications, it may be appropriate to use a layered structure that includes padding for shock absorption, thermal insulation or other protective covering, such as NOMEX® or other fire-retardant material that can be incorporated in or underneath a hard exterior shell.

FIG. 26 provides a three-dimensional drawing of an exemplary implementation of the inventive spherical robot. As illustrated, the frame 202 should fit snuggly within the spherical shell 210. For the example of a cubic frame, the corners of the frame may be chamfered, as shown, to provide a broader, angled and somewhat rounded surface to contact the inner surface of the shell (as opposed to having sharp corners on the frame). This provides uniform structural support for the shell 210 while ensuring that the frame 202 and the components mounted thereon are stably supported, i.e., so that the frame does not move relative to the shell.

As illustrated, each SGCMG 204a-d incorporates the spin motor (the shaft of the spin motor 220 can be seen in FIG. 26) and reaction wheel within a small, flat cylindrical housing, which is fixedly mounted on the corresponding gimbal axis 206a-206d. Power for driving the spin motor is provided through wires running through the corresponding gimbal axis. One end of each gimbal axis is attached the shaft of a gimbal motor 222, while the other end of the axis is supported within a pivot so that the axis and reaction wheel rotate when driven by their corresponding gimbal motor.

All electronic components for operating, communicating with, and collecting data, if appropriate, including all wiring and connectors, will be housed within shell 210, preferably centered within frame 210 to place the weight at the center of the sphere. The components, which may include one or more printed circuit boards with associated battery casings or other holders, may be supported on a bar or plate that extends between opposite corners of the cube or between the upper face 208e and lower face 208f of the cube as illustrated, so as not to interfere with movement of the elements 204. Some of the components, e.g., the batteries, may alternatively be mounted within the inside edges of the frame if the frame is hollow. In an alternative embodiment, elements 204 may be mounted on all 6 faces of the cube, or on all faces of a selected geometric structure, as long as sufficient space is provided to avoid interference between movement of momentum exchange elements and other components of the system.

Figure 27A:
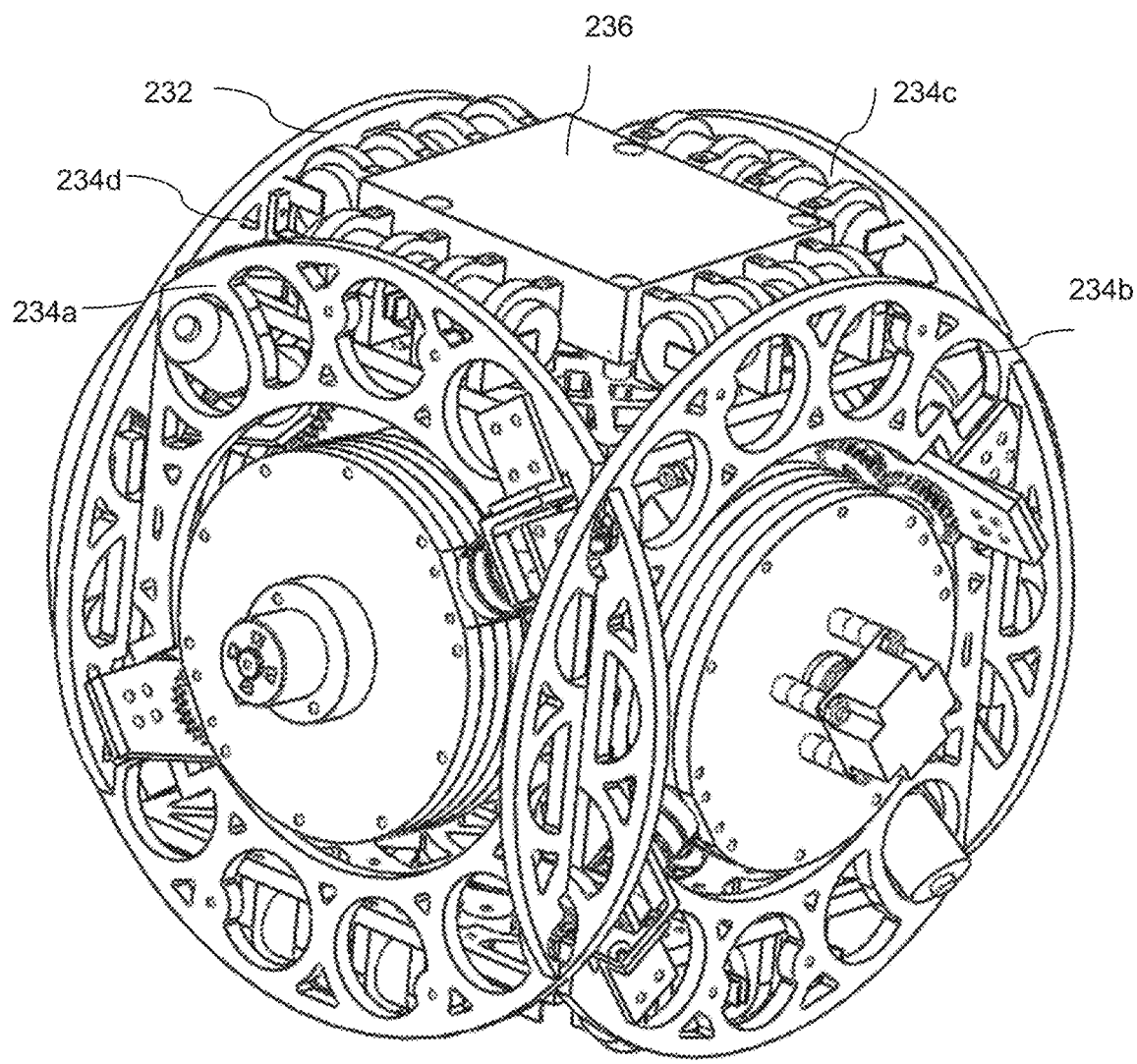
FIG. 27a is a perspective drawing of a second exemplary construction of the spherical robot.
Figure 27B:
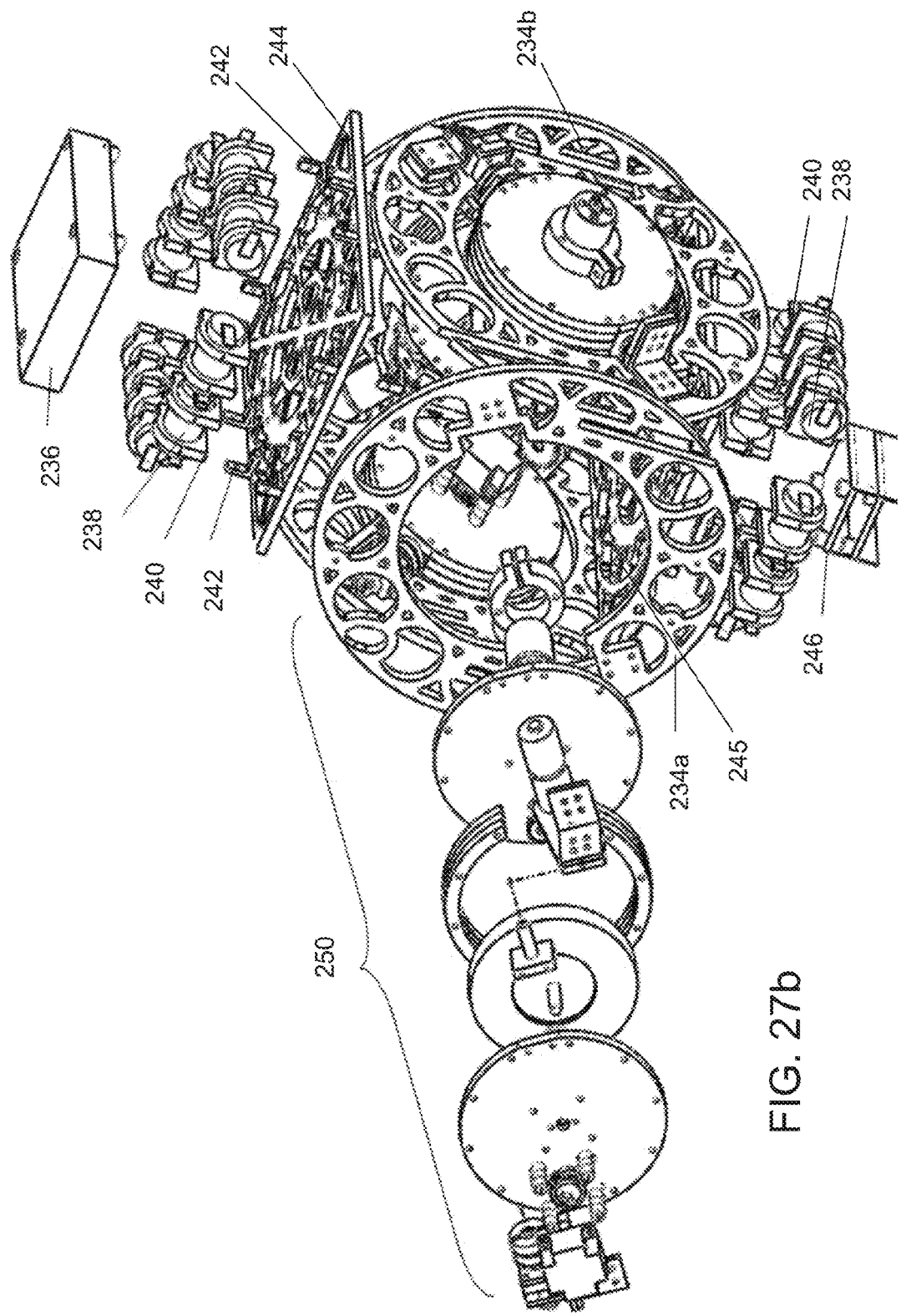
FIG. 27b is an exploded view of the construction.

FIGS. 27a and 27b illustrate an alternative construction of the spherical robot with the outer shell removed. In this case, the frame 232 is formed by the intersection of four open-centered disks 234a-d that correspond to faces 208a-d of FIGS. 23 and 26. The rounded faces provide additional structural support for the spherical shell. The top housing 236, which encloses the control electronics is attached to the top of frame 232.

Referring to FIG. 27b, which shows an exploded view of the full assembly with one SGCMG also in exploded view, the frame is defined by the assembly of faces 234a-234d with top plate 244 and bottom plate 245, which are attached by brackets 242. In addition to the top housing 236, attached to the upper surface of top plate 244 are a number of battery holders 240 for retaining batteries 238. As illustrated, the batteries are button style lithium batteries. Additional battery holders 240 and batteries 238 are located on the outer surface of bottom plate 245 along with the gimbal motor controllers 246.

Figure 27C:
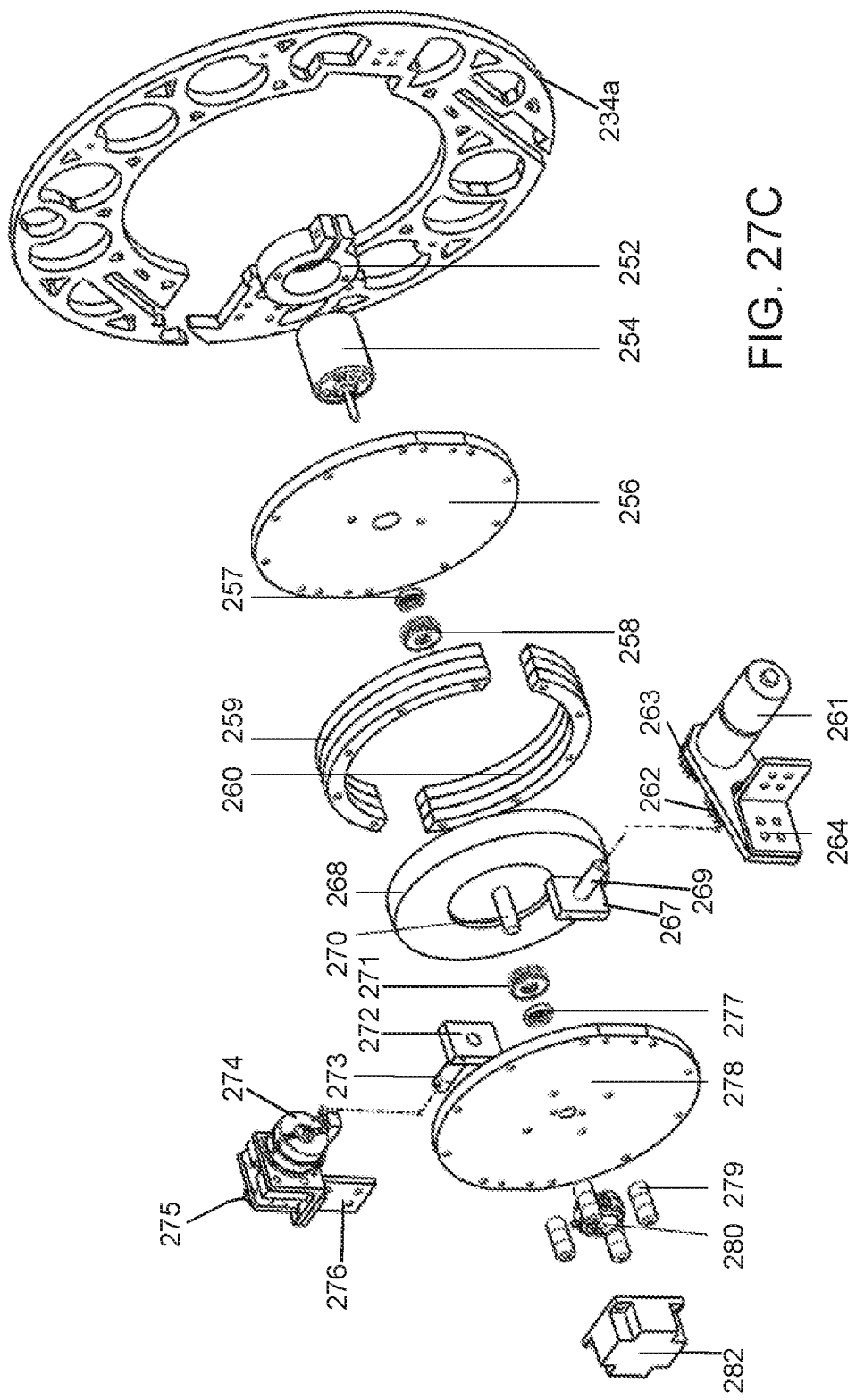
FIG. 27c is an exploded view of one SGCMG element.

FIG. 27c shows an exploded view of SGCMG 250 shown in FIG. 27b. The rotor 268 is attached to the rotor shaft 270. The rotor provides the inertia for the momentum storage of a SGCMG. The rotor and rotor shaft 268, 270 are held in place relative to the outer housing formed from the combination of 256, 259, 260, 267, 272 and 278, by a journal 252, 277 and thrust bearing 258, 271 combination. The shaft of the spin motor 254 is attached to the rotor shaft 270 and the spin motor 254 is attached to the c-ring 252, which is also attached to the bottom plate 256 of the housing. The spin motor 254 rotates the rotor 268 at a constant rate (in the SGCMG case) or varies the angular rate (in the VSSGCMG case) via feedback from the optical encoder 280 and spin motor electronics 282. The rotor speed is measured by the optical encoder 280, which is attached to the top plate 276 of the housing. The spin control electronics 282 are mounted to mounting posts 279, which are also attached to the top plate 276 of the housing. The housing assembly 256, 259, 260, 267, 276, 278 is attached to gimbal shafts 269,273. One gimbal shaft 269 is attached to a spur gear 262, which is free to rotate relative to the right gimbal mounting bracket 264 via a thrust/journal bearing combination. This spur gear 262 is kinematically constrained to a second spur gear 263 which is attached to the gimbal motor 261 and is also free to rotate relative to the right gimbal mounting bracket. The second gimbal shaft 273 is rigidly attached to the slip ring assembly 274 and is free to rotate relative to the left gimbal mounting bracket 276 via a thrust/journal bearing combination. The slip ring assembly 274 provides power (in spite of the continuous rotation of the gimbal) to the spin motor controller 282. The angular rotation of the gimbal shaft 273 is measured by a potentiometer 275 whose movable part is attached to the gimbal shaft and immovable part is attached to the left gimbal mounting bracket (28). The left 276 and right 264 gimbal mounting brackets are attached to the sidewall 234a.

In one embodiment, the spherical robot may have pressure bladders attached on the inner surface of the shell 210 or on non-interfering locations on the frame 202. (A single exemplary pressure bladder 214 is diagrammatically illustrated in FIG. 23). The bladders will preferably be uniformly distributed around the inner surface of the shell, e.g., on the edges of two opposite faces of the cube, to control buoyancy, thereby allowing the robot to float on the surface of a liquid, e.g., a natural or artificial body of water, or to move fully- or partially submerged below the surface. Operation of the momentum exchange elements will allow the buoyant robot to move within or over the surface of the body of water as the robot spins, thus providing an amphibious vehicle. In one implementation, the bladders may be pre-filled to the desired buoyancy prior to deployment of the robot via a valve accessible through the shell. In another approach, small compressed gas canisters, as are known in the art for use in life vests and buoyancy compensators, may be mounted on the frame in communication with a feedback system that will determine the conditions in the body of water, e.g., temperature, surface turbulence and weather conditions, and control the amount of gas released into the bladders to achieve the desired buoyancy and friction with the water's surface to maneuver effectively and efficiently. Bleed valves on the bladders may also be provided to actively adjust the buoyancy as needed under changing conditions. The gas canisters may be replaced with new canisters after one or more uses.

Alternatively, the robot can be made passively buoyant through material selection. For example, the frame can be constructed using a lightweight material such as plastic, wood or fiberglass, or using lightweight metals such as titanium or aluminum when the strength and durability of metal is required. The material used for the frame can also be hollow or partially-hollow, e.g., honeycomb structures or extruded channel. The shell, which would need to be a continuous surface without any openings to make it watertight, could be a formed from a buoyant plastic or polymer, such as polystyrene, neoprene or closed cell foam. The buoyant foam structure could be covered with an impervious outer skin or coating, such as a lightweight metal, for applications where metal is preferred, or an epoxy resin or other polymer, using a construction similar to that used in typical surfboards. Openings (ports or doors) in the shell for accessing the interior components of the robot would need to be sealable to produce a watertight closure.

Figure 28:
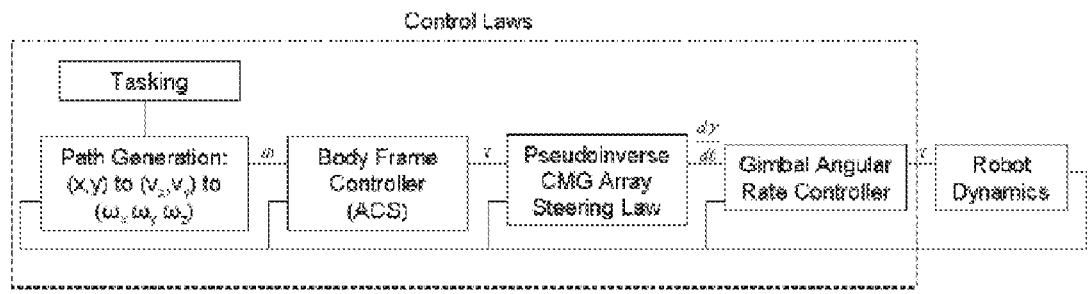
FIG. 28 is a block diagram showing the sequence of control operations for the spherical robot.

FIG. 28 provides a block diagram of an exemplary control architecture that can be used with the spherical robot. As will be recognized by those in the art, other control architectures can be use. The path generation block can be achieved by the relationship between the velocity of the body and the angular rate. The ACS control law block, pseudoinverse CMG steering law block, and gimbal angular rate controller block can be derived using procedures and algorithms that are known in the art.

Figures 29A, 29B:
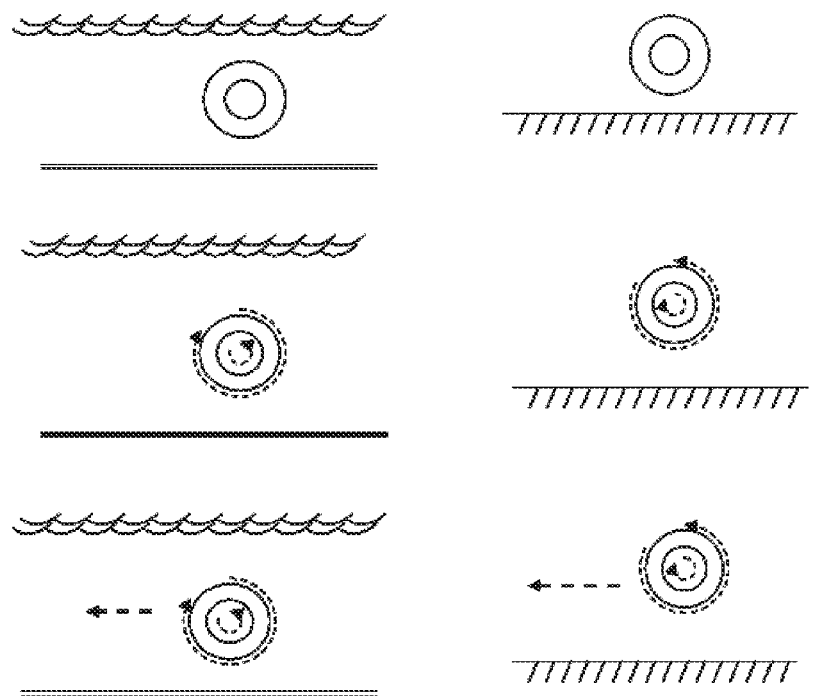
FIGS. 29a-29c illustrate examples of possible functions that can be performed using the spherical robot, where
Figure 29C:
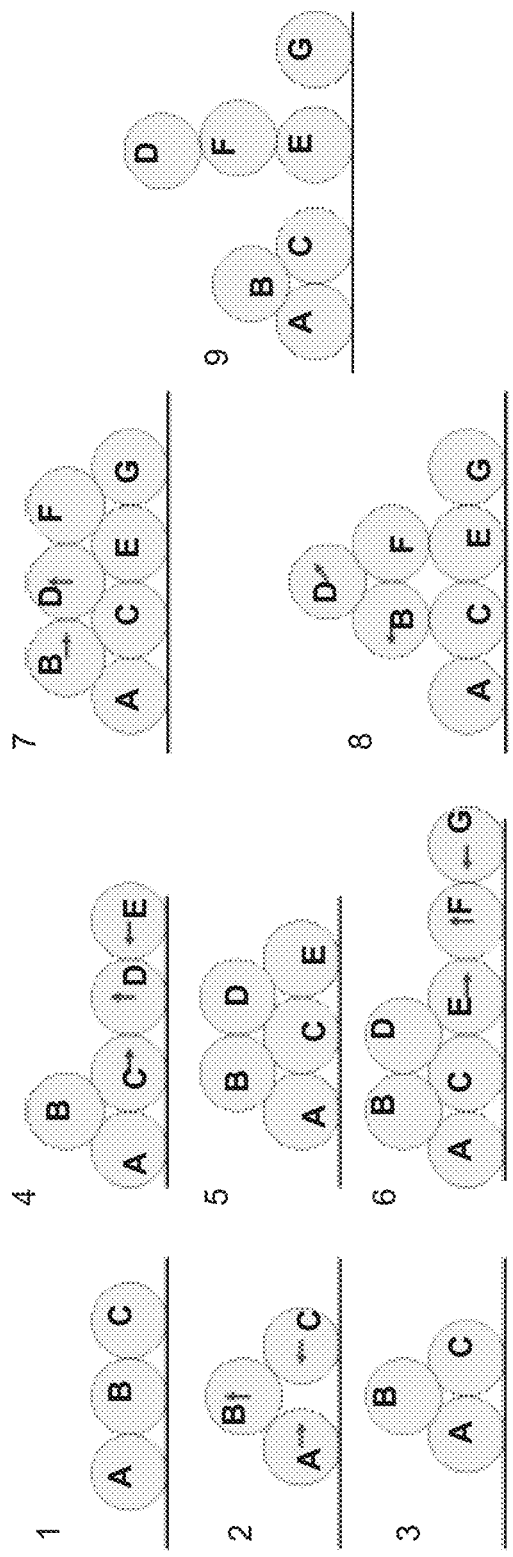

Locomotion within a body of liquid can be achieved by activating the momentum exchange elements to rotate the robot's body in the direction of desired motion, the same as would be used on land. FIGS. 29a-c illustrate different applications of the spherical robot. Using a series of cartoons depicting an exemplary robot with a single RWA, FIGS. 29a and 29b illustrate a free-surface case and a near-a-surface case, respectively. In FIG. 29a, in a fluid, when the RWA spins one direction (counter-clockwise as shown), the sphere spins in the opposite direction (clockwise as shown). The fluid's interaction between the rotating sphere and the free-surface causes the sphere to move in translation to the left, as dictated by known analytical solutions to the Navier-Stokes equations, which prove that a rotating sphere in an incompressible viscous fluid near a wall (or free surface) can move in a translational direction orthogonal to the angular rate and parallel to the wall (or free surface). See. e.g., J. Happel and H. Brenner, *Low Reynolds Number Hydrodynamics: with special applications to particulate media*, Springer 1983, which is incorporated herein by reference. In FIG. 29b, which represents movement on top of a surface, when the RWA spins one direction (clockwise as shown), the sphere spins in the opposite direction (counter-clockwise as shown), propelling the sphere to the left.

A plurality of spherical robots can work in cooperation to facilitate locomotion and overcoming various obstacles. As illustrated in FIG. 29c, a sequence of steps is shown for stacking a number of spherical robots to increase the height of one or more robots, thus giving the uppermost robot(s) an increased perspective to for collection of visual information or for other tasks that may require an obstacle to be overcome. In step 1, three spherical robots, designated as A, B and C, start off positioned side-by-side on a support surface. Robots A and C move toward robot B to squeeze B upward in step 2. In step 3, A and C come together with B balanced on top. In step 4, robots D and E are added to the mix, with C and E being moved toward each other to squeeze D upward. A will move along with C to keep B on top. In step 5, B and D are on top after C and E come together. Added spherical robots F and G combine with E in step 6 to force F upward, after which B, D and F are supported on top of A, C, E and G. In step 7, B and F move toward each other to squeeze D upward. In step 8, D moves up and to the right to climb up on F while B moves back to the left. In step 9, the dynamic balancing ability provided by the multiple momentum exchange elements of each robot allows D to balance on top of F which in turn balances on top of E, as shown in step 9. Stacking the spherical robots makes it possible to position a robot with a camera or other sensor to look over an obstacle. Thus, the spherical robot, while taking advantage of a low profile to approach a target by passing under a variety of obstacles, a still able to cooperate with other similar robots to enable climbing to overcome obstacles.

In an exemplary application, multiple spherical robots can be deployed, with each robot carrying a different instrument or payload. The deployed robots can cooperate to enable the robot carrying a particular instrument to position itself optimally for completing its task. In military or law enforcement applications, the above-described spherical robot can be used in covert reconnaissance or munitions delivery. Commercial applications of the robot include incorporate of the robot a toy or a therapeutic device.

Fourth Multimodal Robot Embodiment

FIGS. 30-36 illustrate a fourth embodiment of the multimodal robot, which is a wirelessly-controlled vehicle that can perform the tasks of object retrieval, storage and throwing. The design includes an integrated ball pick up mechanism and a throwing arm. Although described in the example as a ball-handling robot, the fourth embodiment is not limited to balls, but may be adapted to pick up and throw other objects that are sufficiently symmetric to allow the pick-up mechanism to work. Similarly, the throwing arm, described in the example as "jai alai-style", is not limited to a jai alai shape, but may be of different shapes depending on the desired speed, trajectory and spin of the object being thrown.

To enable ball pick up, the body and wheels of the robot are spaced to provide automatic pickup and loading of the target balls. This feature allows the operator to drive the robot toward the target, with the curvature of the robot directing the ball into the space between the wheel and the body. The rotation of the wheel brings the ball up to be stored within a basket or other storage receptacle.

For throwing, the robot is stabilized by a feedback control circuit to balance upright as an inverted pendulum. The rotational inertia produced by the motors that drive the wheels allows the robot to rotate the body rapidly from a lay-down mode to an upright mode. This rapid rotation results in the effective toss of a lightweight ball. The exemplary shape of the throwing arm imparts a spin to the ball as it rolls off the throwing arm track, resulting in a more stable and longer throw.

Figure 30:
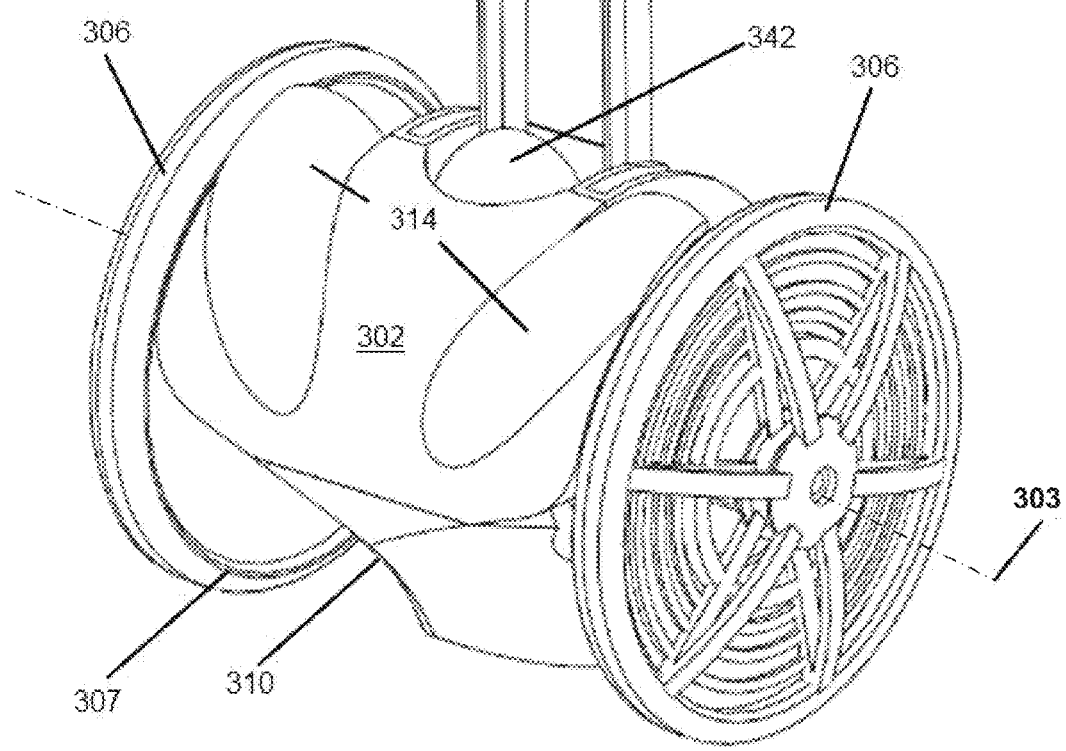
FIG. 30 is a perspective view of a fourth multimodal robot embodiment.

As illustrated in FIGS. 30 and 31, the fourth robot embodiment 300 includes a molded body 302 that is roughly cylindrical in shape (circular as viewed from the side) with a diameter and a width (between the wheels) that is approximately three times the diameter of the target object. In the exemplary embodiment, the target object is a ping pong ball with a diameter of about 40 mm. Two coaxial wheels 306 are mounted on a rotational axis 303. Each wheel 306 is independently driven by a motor (not shown) that is responsive to active feedback controls to provide the robot with a self-balancing function. Control electronics for receiving feedback and actuating the motors are mounted on a printed circuit board (not shown) that is housed under a removable back cover 309. One or more batteries (not shown) for providing power to the motors and electronics are preferably enclosed within the lower portion of body 302, below the rotational axis 303, and are also accessible through back cover 303. The center of gravity of the robot is above the rotational axis so that when the motors are disconnected from its power source, i.e., switched off, the robot falls over.

The vertical arm 304 is configured as a track for launching the object as well as being a mass the enables backward and forward motions through leaning. In the exemplary embodiment, the track has a slight curvature that is similar in design to a jai alai cesta (basket). When the robot leans forward, it moves forward to restore vertical balancing. Turning is facilitated by rotating the wheels in opposite directions.

The feedback controls that enable self-balancing rely on a comparison of the signals of two MEMS (micro electro-mechanical systems) accelerometers, which are well known in the art. One such accelerometer 324 is located on a platform 322 near the upper end 318 of the vertical arm 304. The feedback from this sensor may be turned off or ignored to allow a horizontal orientation of the robot with the arm 304 (actually, the bottom surface of platform 322) dragging on the support surface, as shown in FIG. 36a. Orientation in the horizontal mode is necessary to initiate the throwing process. The second accelerometer is located coplanar with, and at a fixed distance from, the first. In the exemplary embodiment, the second accelerometer is located on the printed circuit board under removable back cover 309, near the axis of rotation 303 of the wheels 306. Comparing the signals from the two accelerometers yields decoupled rotational and translational acceleration measurements.

Figure 31A:
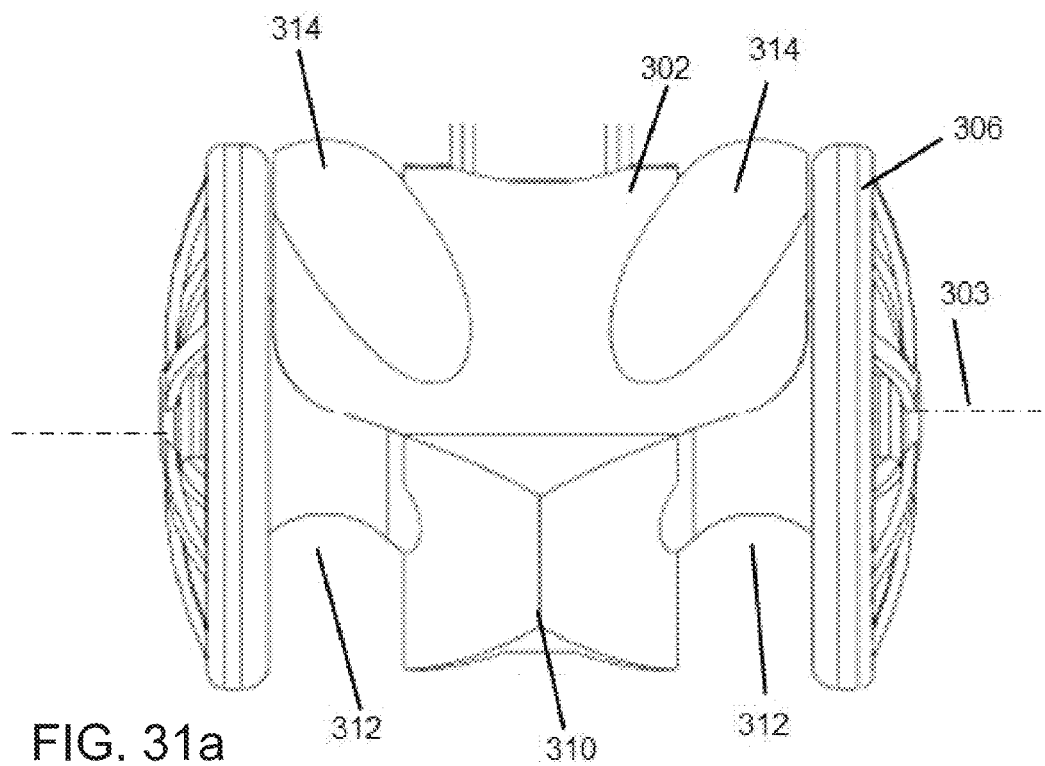
FIGS. 31a and 31b are a front view and a rear view, respectively, of the body portion of the multimodal robot of FIG. 30.
Figure 31B:
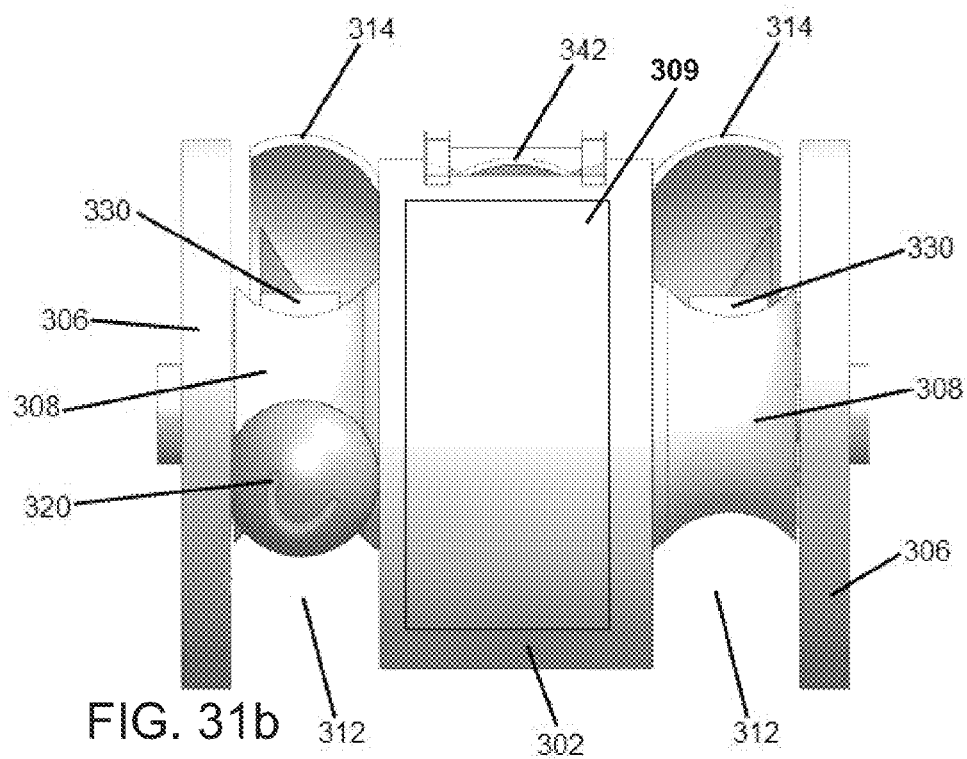

Referring to FIGS. 31a and b, the pick-up mechanism comprises a circular channel 312 formed on each side of a central plane bisecting the robot between the lower portion of body 302 and the inner surface of the wheel 306. The body has a peaked leading edge 310 that is coincident with the central plane. The leading edge 310 acts as a guide, similar to the bow of a ship, to direct the target object (ball) to one side of the centerline and toward one of the channels 312. The scooped contour of the hub sections 308, in combination with the inner surface of the wheels and the guide 310, define channels 312, which direct the ball into position for pick-up. The inner surface of each wheel has a compressible foam insert 307 to generate friction against the ball, causing it to be captured within the channel to be drawn along with the wheel as it rotates. Other methods for generating sufficient friction to capture the ball between the hub and the inner surface of the wheel may be used, including spring-loaded tracks, other compressible/resilient surfaces, or rough textures molded into or applied to the inner surfaces of the wheels to generate sufficient friction to pull the ball into the channel.

Figures 32A, 32B:
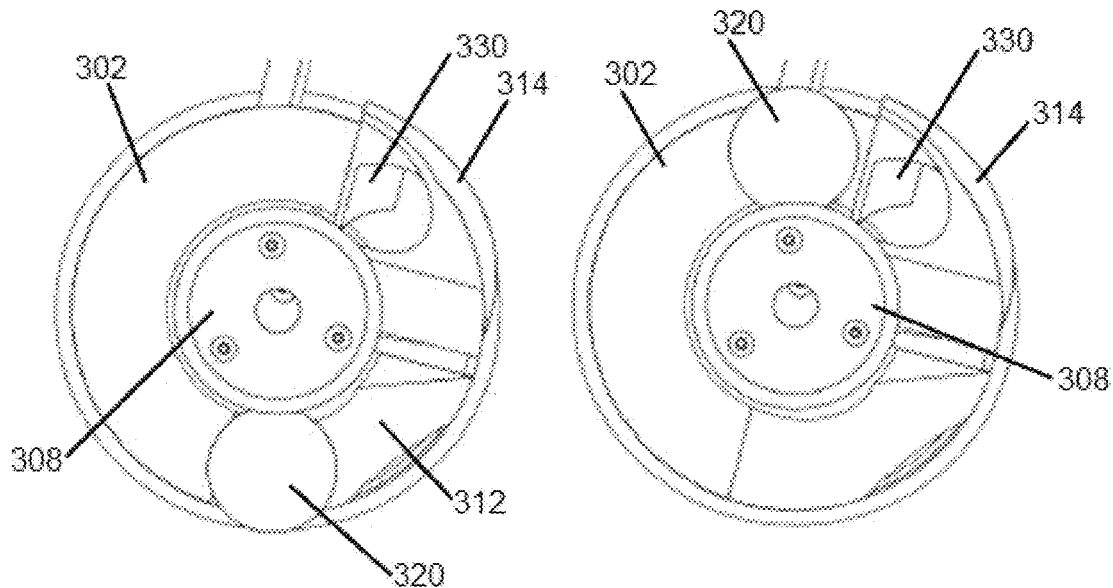
FIGS. 32a and 32b are side views of the body portion with the wheel removed showing steps in a sequence for picking up a round object.
Figure 33:
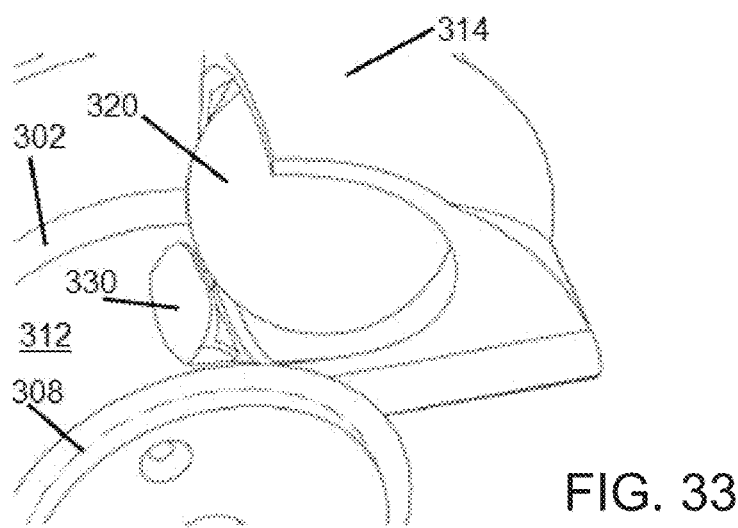
FIG. 33 is a perspective view of latch for preventing the object from rolling backward in the channel.

Referring to FIGS. 32a and 32b, as the wheel 306 rotates forward relative to the body, the ball rolls within the channel 312 into a storage volume 316 located at the center of a hollow portion of body 302, between hubs 308. (For clarity, the body is shown with the wheel removed.) Since the robot is able to turn on a point due to the independent operation of the wheels, similar to a treaded vehicle, ball pickup is possible even when the robot spins in place, as long as the wheel in contact with the ball is moving forward with respect to the body 302 to draw the ball into the channel.

Referring again to FIGS. 31a and 31b, in the upper portion of body 302, channels 312 continue into a curved passageway defined by channel covers 314, which help guide the ball into the storage volume 316 within the body 302. At the opening defined by the edge of each channel cover 314 is a spring-loaded flipper 330. A detailed view of the flipper 330 can be seen in FIG. 33. The flipper 330 is depressed by the ball as it enters the channel cover 314 and approaches the storage volume, then resiles once the ball is past to extend up into the channel 312 to prevent the ball from leaving the storage volume through the channel. Once the ball is in the storage volume 316, it is ready to be thrown.

Figure 34A:
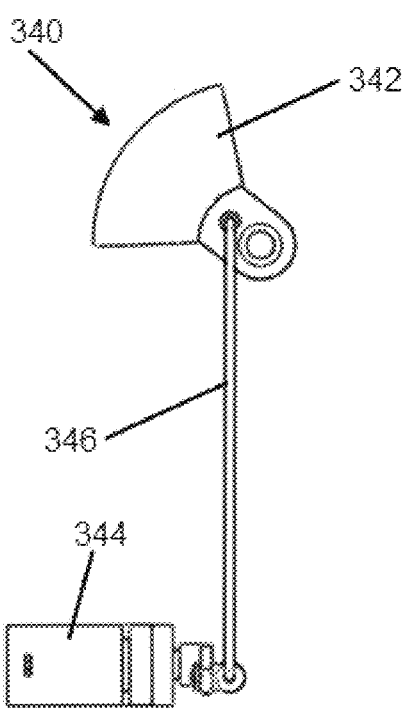
FIGS. 34a and 34b are side and perspective views, respectively, of a ball release mechanism.
Figure 34B:
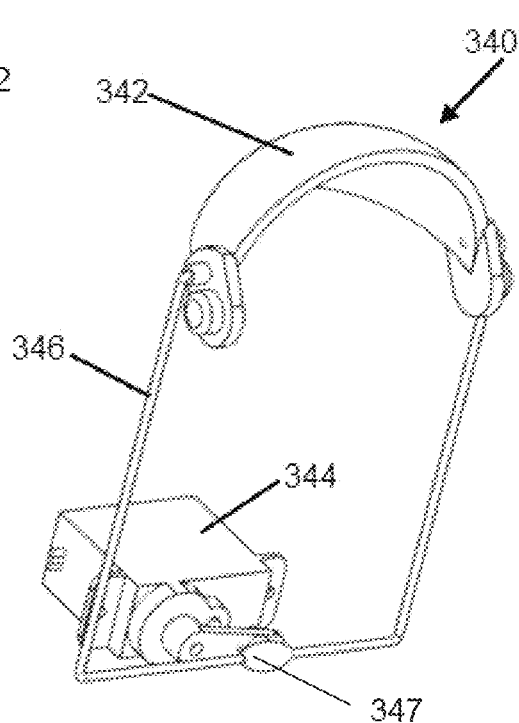

The ball release mechanism 340, illustrated in FIGS. 34a and 34b, is mounted within the center of body 302 within the storage volume 316. (The location of mechanism 340 can be seen in FIG. 35a-35c.) The ball release mechanism consists of a gate 342 which is connected to a servo motor 344 by a push rod 346 and a cylindrical sliding collar 347. The push rod 346 slides freely along the axis of the cylindrical sliding collar 347 and is displaced in the direction normal to the cylindrical sliding collar. The servo motor 344 may be radio-controlled or activated by a system controller (not shown). The gate 342 has a curved surface that is shaped to match the exterior dimensions or the ball. The arc length and/or angle of the gate is preferably large enough to prevent passage of multiple balls while being small enough to minimize servo movement and release time.

Figure 35A:
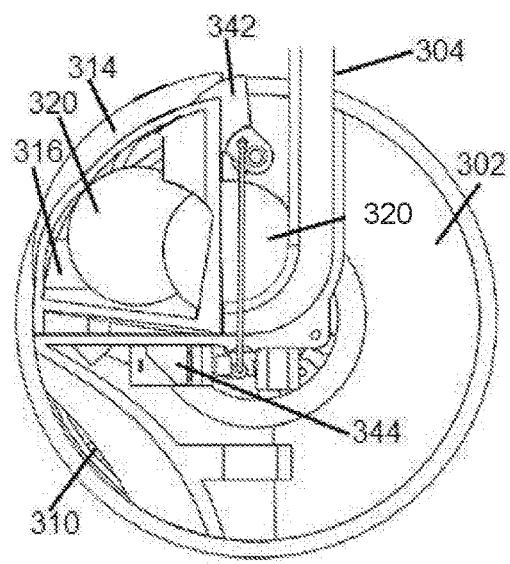
FIGS. 35a-35c are cross-sectional views of the robot body showing the ball release sequence.
Figure 35B:
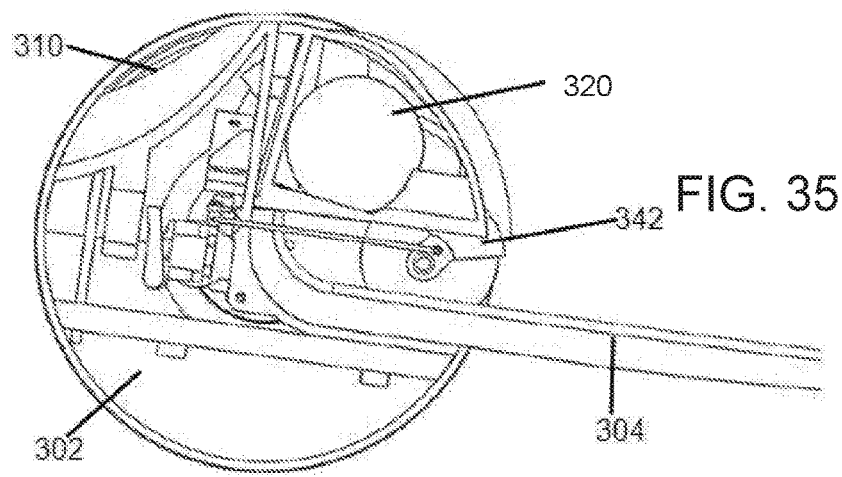
Figure 35C:
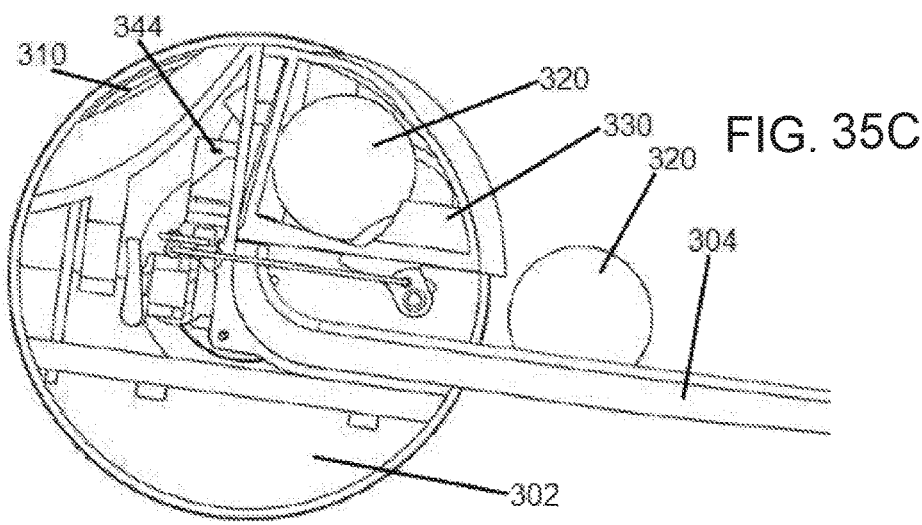

FIGS. 35a-35c are cross-sectional views of the robot body illustrating a sequence of steps within the ball release function. In FIG. 35a, the robot 300 is in an upright orientation, which is the appropriate orientation for collecting the balls for storage within the storage volume 316. The ball release mechanism 340 is in its normally closed position to prevent balls from escaping from the storage volume unintentionally. The shape of the gate 342 allows a single ball to sit at the base 348 of the throwing arm 304 while the robot is upright. The bottom of storage volume 316 is sloped toward the rear of the body to encourage the ball toward the throwing arm base 348.

FIG. 35b shows the robot after rotation of the body and throwing arm to a horizontal orientation. The gate 342 of ball release mechanism 340 remains closed to prevent balls 320 from rolling out of the storage volume.

In FIG. 35c, when the throwing function is to be executed, the servo motor 344 of ball release mechanism 340 is triggered to open the gate briefly to allow one ball 320 onto the track of throwing arm 304.

FIGS. 36a-36d illustrate a sequence of steps of the throwing or launching function. By conservation of angular momentum around the robot's center of gravity, the throw can be performed by rapid reverse acceleration of the wheels 306 in a direction away from the throwing arm. This causes the body 302 to suddenly rotate in the opposite direction, so that the throwing arm 304 quickly rotates up and forward. As seen in FIG. 36b-36d, the throwing motion imparts a forward velocity on the ball relative to the support surface. Because the ball rolls along the track rather than sliding up to the release end 318, the track imparts a backspin on the ball 320, which improves flight stability and effective range.

The fourth embodiment of the multimodal robot may be controlled remotely by wireless communication with a simple joystick and/or push button controller, or it may possess sensors (optical, audio, temperature, chemical, etc.) and internal circuitry including a computer controller capable of effecting autonomous behavior with adaptive response to the sensor feedback of environmental conditions. Using vision, motion, heat or other object detection technology, the robot may be capable of tracking and seeking a target object to pick up, store and throw to a user or another robot. Another potential embodiment may consist of just object pick up and storage for the purpose of object retrieval and transport. Adaptive behavior would, for example, allow the robot to be operated in horizontal mode to pass under obstacles or to maintain a low profile to avoid detection, shifting to the vertical orientation as needed to pick up an object and return to horizontal mode to initiate a launching sequence. Additionally, the robot may be configured for catching as well by means of a modified track. The appeal of a catching robot is the active responsiveness of the robot's self-balancing. The combined abilities of the fourth multimodal robot embodiment to catch, throw, seek and pick up objects autonomously would allow for "team" sports or robotics competitions.

The above-described multimodal robots all incorporate a number of design features that are important to their successful operation. These features include (1) multifunctional wheels, which are used for main-drive, differential-steering wheels, upright actuators, reaction wheels, counterweights and ball pick-up mechanisms; (2) multifunctional motors used to produce completely different effects when driven clockwise or counterclockwise by virtue or creative use of latching mechanisms; (3) sensors that provide feedback to a system controller for reactive actuation of motors for balancing and locomotion; and (4) custom printed circuit boards used to connect exactly the right electronics together with a minimum footprint and mass, in addition to high-performance COTS boards such as the Texas Instruments C2000 MCU (used in the first embodiment), the National Instruments sbRIO 9602 (used in the second embodiment) and the Technologic Systems TS-7250 (used in the third embodiment), with both low-level coding in C as well as high-level control design leveraging MathWork's MATLAB® SIMULINK® software and National Instrument's LabVIEW™ CD&Sim™ modules, respectively, to program the Texas Instruments and National Instruments boards.

The above-described robots by may be combined to perform a variety of different tasks that may be useful in areas including defense, counterterrorism, surveillance and law enforcement, industrial applications, such as transport of payloads and environmental monitoring in areas that are hazardous or otherwise difficult to access, space exploration, entertainment, along with many other possible uses. For example, features of the tracked robot of the second embodiment could be combined with the throwing function of the fourth embodiment to allow a robot to travel over rough terrain and/or climb over obstacles, the deliver an object by launching it using the throwing functions of the fourth embodiment.

While the foregoing written description contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

The invention claimed is:

1. A robotic system comprising:
    a body having a body length, a first body end, and a second body end;
    a pair of treaded arms disposed on opposite sides of the body each treaded arm comprising:
        a first arm end rotatably disposed on an axle defining a pivot point near the first body end, the first arm end having a first wheel rotatably disposed thereon;
        a second arm end having a second wheel rotatably disposed thereon,
        wherein the treaded arm has an arm length from the pivot point to the second arm end that is slightly longer than the body length from the pivot point to the second body end; and
        a tread having an inner surface configured to engage the first wheel and the second wheel, and an outer surface configured to contact a support surface;
        wherein each treaded arm is configured for rotation around the pivot point at a plurality of arm angles relative to the body and to extend the second arm end away from the body;
    a first motor associated with each treaded arm, the first motor configured to drive the tread around the associated treaded arm;
    at least one second motor associated with the treaded arms;
    a linkage between the at least one second motor and the axle for each treaded arm, wherein activation of the at least one second motor rotates one of the body and the corresponding treaded arm relative to the other;
    a system controller configured for generating a signal for actuating each motor;
    one or more sensors in communication with the system controller configured for generating feedback signals to reactively actuate one or more of the motors to control each treaded arm to dynamically shift a combined center of gravity of the body and treaded arms in line with a contact point on the support surface and to execute one or more functions selected from the group consisting of forward motion, backward motion, climbing, and balancing relative to the contact point; and
    a power source.

2. The robotic system of claim 1, wherein the linkage between the at least one second motor and the axle for each treaded arm and a linkage between the first motor and the first wheel are incorporated in a two-degree of freedom joint.

3. The robotic system of claim 1, wherein the treaded arms are configured to rotate anti-symmetrically to extend an effective length of the robot.

4. The robotic system of claim 1, wherein the first wheels and the second wheels each comprise sprockets configured to engage with the inner surface of the tread.

5. The robotic system of claim 1, further comprising a plurality of wheels disposed on the second body end.

6. The robotic system of claim 1, wherein the system controller is configured to generate signals to the at least one second motor to extend the body upward from the treaded arms and to the first motors to cause the treaded arms to toe balance on the second arm ends.

7. The robotic system of claim 1, wherein the system controller is configured to generate signals to the at least one second motor to extend the body upward from the treaded arms and to the first motors to drive the treads around the treaded arms to effect forward motion or backward motion.

8. The robotic system of claim 1, wherein the system controller is configured to generate signals to the first motor and the at least one second motor to cause the body to extend upward from the treaded arms while balancing on the second arm ends and to effect forward motion or backward motion.

9. The robotic system of claim 1, wherein the system controller is responsive to a wireless remote control signal.

10. A robotic system, comprising:
    a body comprising a chassis, wherein the chassis is disposed near a first end of the body;
    a drive arm disposed on each side of the chassis at a pivot point, each drive arm having a first arm end having a first wheel, and a second arm end having a second wheel, wherein each drive arm is configured for rotation at the pivot point to effect a plurality of arm angles relative to the body and to extend the second arm end away from the body, and wherein an arm length from the pivot point to the second arm end is slightly longer than a body length from the pivot point to the second body end;
    a tread extending around each drive arm, the tread having an inner surface configured to engage the first wheel and the second wheel, and an outer surface configured to contact a support surface;
    a drive motor configured for rotating the tread around the drive arm;
    at least one arm motor configured for driving rotation of the drive arms and the chassis relative to the other;
    a system controller configured for generating a signal for actuating each motor;
    one or more sensors in communication with the system controller configured for generating feedback signals to reactively actuate one or more of the motors to control each drive arm to dynamically shift a combined center of gravity of the body and drive arms in line with a contact point on the support surface and to execute one or more functions selected from the group consisting of forward motion, backward motion, climbing, balancing relative to the contact point; and
    a power source.

11. The robotic system of claim 10, further comprising a plurality of wheels disposed on a second end of the body.

12. The robotic system of claim 10, further comprising a first linkage between the drive motor and the first wheel, and a second linkage between the at least one arm motor and an axle for each drive arm.

13. The robotic system of claim 12, wherein the first linkage and the second linkage are incorporated into a two-degree of freedom joint.

14. The robotic system of claim 10, wherein the first wheels and the second wheels each comprise sprockets configured to engage with the inner surface of the tread.

15. The robotic system of claim 10, wherein the system controller is configured to generate signals to the at least one arm motor to extend the body upward from the drive arms and to the drive motors to cause the drive arms to toe balance on the second arm ends.

16. The robotic system of claim 10, wherein the system controller is configured to generate signals to the at least one arm motor to extend the body upward from the drive arms and to the drive motors to drive the treads around the drive arms to effect forward motion or backward motion.

17. The robotic system of claim 10, wherein the system controller is configured to generate signals to the drive motor and at least one arm motor to cause the body to extend upward from the drive arms while balancing on the second arm ends and to effect forward motion or backward motion.

18. The robotic system of claim 10, wherein the system controller is responsive to a wireless remote control signal.

19. A method for maneuvering a robotic system having a body comprising a chassis and a pair of treaded drive arms disposed on opposite sides of the chassis near a first body end, wherein each treaded drive arm has a first arm end having a first wheel, a second arm end having a second wheel, and a tread extending around the first wheel and the second wheel, the first wheel being rotatably disposed on an axle coaxial with the chassis at a pivot point, wherein an arm length from the pivot point to the second arm end is slightly longer than a body length from the pivot point to the second body end, and wherein each drive arm is configured for rotation at different arm angles relative to the body and to extend the second wheel away from the body, the method comprising:
  providing a drive motor for rotating the tread of each treaded drive arm;
  providing at least one arm motor for rotating the chassis and the treaded drive arms relative to each other;
  activating the at least one arm motor to rotate the chassis at a non-parallel angle relative to a support surface;
  activating the drive motors to lift one of the first wheel and the second wheel away from the support surface so that the tread associated with the other wheel is in contact with a contact point on the support surface;
  activating the at least one arm motor to position the chassis at a balance angle relative to the treaded drive arms to shift a combined center of gravity of the body and treaded drive arms over the contact point; and
  activating the drive motors to maintain the combined center of gravity over the contact point.

20. The method of claim 10, wherein the balance angle defines a C-balancing mode, wherein the first wheel is lifted and the second wheel corresponds to the contact point.

\* \* \* \* \*